US011018848B2

(12) United States Patent
Castinado et al.

(10) Patent No.: US 11,018,848 B2
(45) Date of Patent: May 25, 2021

(54) BLOCKCHAIN MANAGEMENT PLATFORM FOR PERFORMING ASSET ADJUSTMENT, CROSS SECTIONAL EDITING, AND BONDING

(71) Applicant: Bank of America Corporation, Charlotte, NC (US)

(72) Inventors: Joseph Castinado, Northglenn, CO (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 243 days.

(21) Appl. No.: 16/237,930

(22) Filed: Jan. 2, 2019

(65) Prior Publication Data

US 2020/0213082 A1    Jul. 2, 2020

(51) Int. Cl.
*H04L 29/00* (2006.01)
*H04L 9/06* (2006.01)
(Continued)

(52) U.S. Cl.
CPC .......... *H04L 9/0618* (2013.01); *G06F 16/235* (2019.01); *G06Q 40/02* (2013.01);
(Continued)

(58) Field of Classification Search
CPC . H04L 9/0618; H04L 2209/38; H04L 9/3273; H04L 29/06816; H04L 63/0869;
(Continued)

(56) References Cited

U.S. PATENT DOCUMENTS 9,397,985 B1    7/2016    Seger, II et al.
9,785,369 B1    10/2017    Ateniese et al.
(Continued)

OTHER PUBLICATIONS

Feb. 24, 2021—U.S. Notice of Allowance—U.S. Appl. No. 16/237,990.
(Continued)

*Primary Examiner* — Jeffrey C Pwu
*Assistant Examiner* — Helai Salehi
(74) *Attorney, Agent, or Firm* — Banner & Witcoff, Ltd.; Michael A. Springs

(57) ABSTRACT

Aspects of the disclosure relate to processing systems perform dynamic asset adjustment. A computing platform may split a parent element of a stored element chain into sub-elements, containing a fixed parameter and a variable parameter and each linked to the parent element through the stored element chain. The computing platform may determine a change in the variable parameter, resulting in a modified variable parameter. Based on a comparison of the modified variable parameter to a plurality of predetermined discrepancy thresholds, the computing platform may determine a number of quorum approvers for approval of the change to the variable parameter. The computing platform may receive quorum approval inputs corresponding to the number of quorum approvers for the approval of the change to the variable parameter. Based on the plurality of quorum approval inputs received, the computing platform may determine that a quorum approval threshold is satisfied.

20 Claims, 21 Drawing Sheets

(51) Int. Cl.
  *G06F 16/23* (2019.01)
  *G06Q 40/02* (2012.01)
(52) U.S. Cl.
  CPC ... *G06Q 2220/127* (2013.01); *G06Q 2230/00* (2013.01); *H04L 2209/38* (2013.01)
(58) Field of Classification Search
  CPC  G06F 16/235; G06Q 40/02; G06Q 2220/127; G06Q 2230/00
  See application file for complete search history.

(56) References Cited

U.S. PATENT DOCUMENTS

| | | | |
|---|---|---|---|
| 9,967,088 B2 | 5/2018 | Ateniese et al. | |
| 9,967,096 B2 | 5/2018 | Ateniese et al. | |
| 9,998,286 B1 | 6/2018 | Ramathal et al. | |
| 10,055,446 B2 | 8/2018 | Pattanaik et al. | |
| 10,084,642 B2 | 9/2018 | Goldfarb et al. | |
| 10,095,878 B2 | 10/2018 | Goldfarb et al. | |
| 10,102,265 B1 | 10/2018 | Madisetti et al. | |
| 10,103,893 B2 | 10/2018 | Kroonmaa et al. | |
| 10,115,068 B2 | 10/2018 | Vivier | |
| 10,121,186 B2 | 11/2018 | Isaacson et al. | |
| 10,127,591 B1 | 11/2018 | Wollmer et al. | |
| 10,129,097 B2 | 11/2018 | Beecham et al. | |
| 10,129,238 B2 | 11/2018 | Kurian et al. | |
| 10,129,269 B1 | 11/2018 | Ford | |
| 10,142,347 B2 | 11/2018 | Kurian | |
| 10,152,756 B2 | 12/2018 | Isaacson et al. | |
| 10,158,703 B2 | 12/2018 | Kurian | |
| 10,163,079 B1 | 12/2018 | Brock et al. | |
| 10,361,852 B2 | 7/2019 | Kazin et al. | |
| 10,374,808 B2 | 8/2019 | Frederick et al. | |
| 10,805,068 B1 | 10/2020 | Leise et al. | |
| 2017/0301033 A1 | 10/2017 | Brown et al. | |
| 2017/0301047 A1 | 10/2017 | Brown et al. | |
| 2017/0352012 A1 | 12/2017 | Hearn et al. | |
| 2018/0082296 A1 | 3/2018 | Brashers | |
| 2018/0115428 A1 | 4/2018 | Lysenko et al. | |
| 2018/0131706 A1 | 5/2018 | Anderson et al. | |
| 2018/0139278 A1 | 5/2018 | Bathen et al. | |
| 2018/0150835 A1 | 5/2018 | Hunt et al. | |
| 2018/0152289 A1 | 5/2018 | Hunt et al. | |
| 2018/0183600 A1 | 6/2018 | Davis | |
| 2018/0239959 A1* | 8/2018 | Bui | G06F 40/103 |
| 2020/0213082 A1 | 7/2020 | Castinado et al. | |
| 2020/0213083 A1 | 7/2020 | Kurian et al. | |
| 2020/0250751 A1* | 8/2020 | Lam | G06Q 30/08 |
| 2020/0351083 A1* | 11/2020 | Bartolucci | H04L 9/30 |

OTHER PUBLICATIONS

Bui et al. "Application of Public Ledgers to Revocation in Distributed Access Control" arXiv:1608.0659v1 [cs.CR] Aug. 23, 2016, 15 pages.
Kokoris-Kogias et al. "Calypso: Auditable Sharing of Private Data over Blockchains" 2018, 17 pages.
Wang et al. "A Blockchain-Based Framework for Data Sharing with Fine-Grained Access Control in Decentralized Storage Systems" IEEEAccess, Jul. 30, 2018, pp. 38437-38450.
Tang et al. "Ensuring Security and Privacy Preservation for Cloud Data Services" ACM, 2016, 39 pages.
Cong et al. "Blockchain Disruption and Smart Contracts" Working Paper 24399, 2018, 52 pages.
Nov. 10, 2020—U.S. Office Action—U.S. Appl. No. 16/237,962.

* cited by examiner

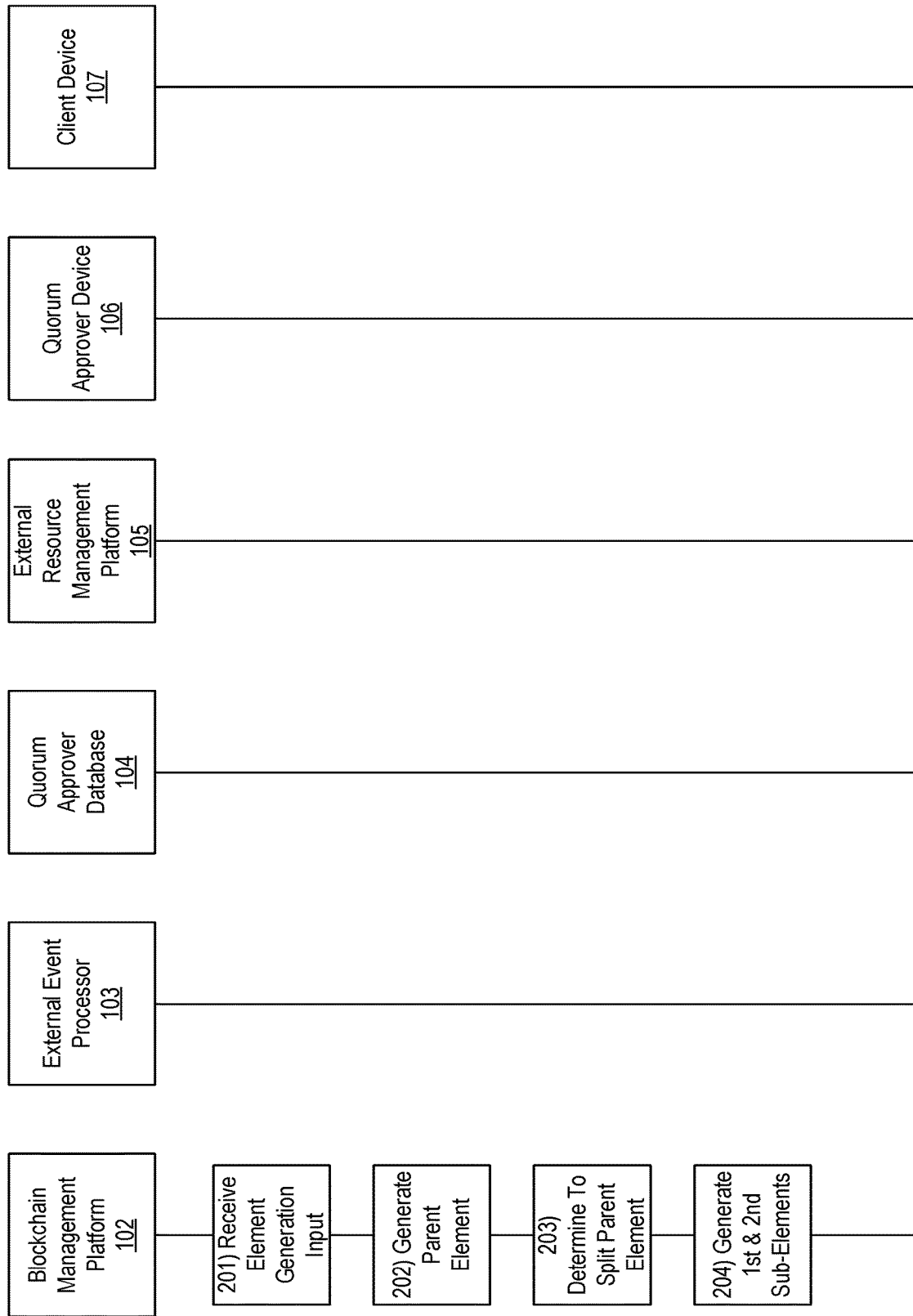

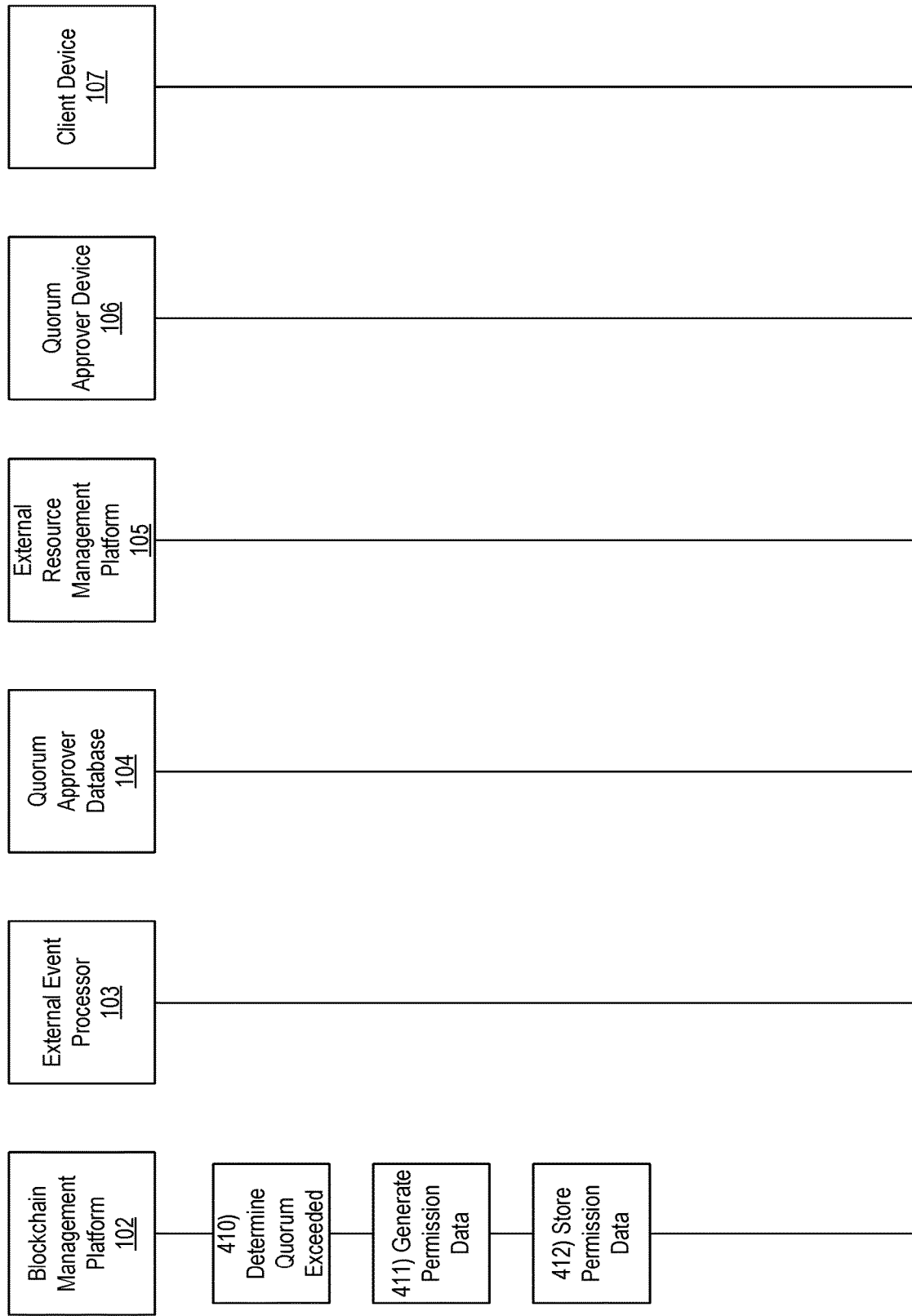

505

Element Split Interface

Please note that the asset indicated below has split.

Asset ID: ID####

Transaction Information: Stock Split

Date/Time: 4:49 PM, Friday, December 7, 2018

Quorum Approval Interface

Please select whether the parameter discrepancy is acceptable.

| Acceptable | Unacceptable |

FIG. 6

BLOCKCHAIN MANAGEMENT PLATFORM FOR PERFORMING ASSET ADJUSTMENT, CROSS SECTIONAL EDITING, AND BONDING

BACKGROUND

Aspects of the disclosure relate to enhanced processing systems for maintaining stored blockchains. In particular, one or more aspects of the disclosure relate to computing platforms that perform asset adjustment, cross sectional editing, and bonding for blockchain management.

Many organizations and individuals rely on blockchain technology as a means for validating transactions. In many instances, however, conventional blockchain management systems may be limited in their ability to edit blocks and maintain quorum approver listings.

SUMMARY

Aspects of the disclosure provide effective, efficient, scalable, and convenient technical solutions that address and overcome the technical problems associated with blockchain management. For example, some aspects of the disclosure provide techniques that may enable computing platforms to perform dynamic asset adjustment, cross-sectional editing, and bonding of new approvers. By using dynamic assets that may be modified as part of a blockchain, the computing platforms may generate sub-threads within the blockchain that may overcome deficiencies of conventional one-to-one relationships between parent and child blocks. By configuring the blocks to be edited by cross-sectional entities, the computing platforms may overcome challenges associated with blockchain maintenance and may increase security measures associated with the corresponding transactions. Additionally, by performing bonding of new approvers, the computing platforms may overcome deficiencies of static approver databases that are unable to dynamically change based on events corresponding to the blockchain.

In accordance with one or more embodiments of the disclosure, a computing platform comprising at least one processor, a communication interface, and memory storing computer-readable instructions may determine to split a parent element of a stored element chain into one or more sub-elements. The computing platform may generate the one or more sub-elements, which may each contain a fixed parameter and a variable parameter and may each be linked to the parent element through the stored element chain. The computing platform may determine a change in the variable parameter, resulting in a modified variable parameter. Based on a comparison of the modified variable parameter to a plurality of predetermined discrepancy thresholds, the computing platform may determine a number of quorum approvers for approval of the change to the variable parameter. The computing platform may receive a plurality of quorum approval inputs corresponding to the number of quorum approvers for the approval of the change to the variable parameter. Based on the plurality of quorum approval inputs received, the computing platform may determine that a quorum approval threshold is satisfied.

In one or more instances, in response to determining that the quorum approval threshold is satisfied, the computing platform may generate one or more commands directing an external event processor to process an event corresponding to the change in the variable parameter. In one or more instances, the computing platform may receive an element generation input. In response to receiving the element generation input, the computing platform may generate the stored element chain including the parent element.

In one or more instances, the computing platform may generate an indication of the generation of the one or more sub-elements. The computing platform may send, to a client device, the indication of the generation of the one or more sub-elements, which may cause the client device to display an element split interface indicating the generation of the one or more sub-elements.

In one or more instances, the computing platform may generate one or more commands directing a quorum approver database to provide quorum approver identity information corresponding to each of the one or more sub-elements. The computing platform may send, to the quorum approver database, the one or more commands directing the quorum approver database to provide the quorum approver identity information corresponding to each of the one or more sub-elements. The computing platform may receive, from the quorum approver database, the quorum approver identity information, corresponding to each of the one or more sub-elements, which may indicate quorum approvers configured to provide approval of the change to the variable parameter.

In one or more instances, the computing platform may generate quorum interface information and one or more commands directing a quorum approver device to generate a quorum approval interface using the quorum interface information. The computing platform may send, to the quorum approver device, the quorum interface information and the one or more commands directing the quorum approver device to generate the quorum approval interface using the quorum interface information.

In one or more instances, the computing platform may determine the number of quorum approvers for approval of the change to the variable parameter further by determining a difference value corresponding to a difference between the modified variable parameter and the fixed parameter, and comparing the difference value to the plurality of predetermined discrepancy thresholds. In one or more instances, the computing platform may determine the number of quorum approvers for approval of the change to the variable parameter by, in response to determining that the difference value does not exceed a first threshold of the plurality of predetermined discrepancy thresholds, determining a first number of quorum approvers. In response to determining that the difference value exceeds the first threshold of the plurality of predetermined discrepancy thresholds but does not exceed a second threshold of the plurality of predetermined discrepancy thresholds, the computing platform may determine a second number of quorum approvers. In response to determining that the difference value exceeds the second threshold of the plurality of predetermined discrepancy thresholds, the computing platform may determine a third number of quorum approvers.

In one or more instances, the second threshold of the plurality of predetermined discrepancy thresholds may be higher than the first threshold of the plurality of predetermined discrepancy thresholds. In these instances, the second number of quorum approvers may be larger than the first number of quorum approvers. Further, the third number of quorum approvers may be larger than the second number of quorum approvers.

In accordance with one or more embodiments of the disclosure, a computing platform comprising at least one processor, a communication interface, and memory storing computer-readable instructions may receive a request, from a client device, to establish an account. In one or more instances, the request may grant the computing platform permission to perform a first subset of event processing steps. In response to receiving the request to establish the account, the computing platform may delegate permission to an external event processor to perform a second subset of event processing steps. In response to receiving the request to establish the account, the computing platform may delegate permission to an external resource management platform to perform a third subset of event processing steps. The computing platform may generate an element chain corresponding to the account, which may include at least a single parent element. In response to receiving a request to process an event, the computing platform may add a sub-element to the element chain corresponding to the event, which may contain a fixed parameter corresponding to an expected value associated with the event and a variable parameter corresponding to an actual value associated with the event. The computing platform may send one or more commands directing the external event processor to process the event. The computing platform may receive a request to write the actual value to the element chain. In response to receiving the request to write the actual value to the element chain, the computing platform may modify the variable parameter of the sub-element to reflect the actual value associated with the event, and may send one or more commands directing the external resource management platform to cause a change in assets associated with the account based on the variable parameter.

In one or more instances, the computing platform may receive a request to write a total actual value of the account to the element chain. In response to receiving the request to write the total actual value of the account to the element chain, the computing platform may modify a variable parameter of the parent element to reflect the total actual value of the account.

In one or more instances, delegating permission to the external resource management platform to perform the third subset of event processing steps may cause the external resource management platform to maintain the assets, generate the request to write the total actual value of the account to the element chain, and send, to the computing platform, the request to write the total actual value of the account to the element chain. In one or more instances, delegating permission to the external event processor to perform the second subset of event processing steps may cause the external event processor to process the event, generate the request to write the actual value to the element chain, and send the request to write the actual value to the element chain to the computing platform.

In one or more instances, after modifying the variable parameter of the sub-element to reflect the actual value associated with the event, the computing platform may determine a difference value between the fixed parameter and the variable parameter. In one or more instances, using the difference value between the fixed parameter and the variable parameter, the computing platform may determine a number of quorum approvers to validate the actual value associated with the event prior to sending the one or more commands directing the external resource management platform to cause the change in the assets based on the variable parameter. In one or more instances, in receiving the request, from a client device, to establish the account, the computing platform may receive an indication of the first subset of event processing steps, an indication of the second subset of event processing steps, and an indication of the third subset of event processing steps.

In accordance with one or more embodiments of the disclosure, a computing platform comprising at least one processor, a communication interface, and memory storing computer-readable instructions may generate a sub-element based on a parent element in a stored element chain, where the parent element is associated with a first list of quorum approvers. The computing platform may determine that the sub-element should be associated with a second list of quorum approvers, different than the first list of quorum approvers. The computing platform may generate authentication keys for the second list of quorum approvers by generating authentication keys for quorum approvers included in the second list of quorum approvers that were not included in the first list of quorum approvers, and revoking authentication keys from quorum approvers included in the first list of quorum approvers that are not included in the second list of quorum approvers. The computing platform may send one or more commands directing a quorum approver database to store the authentication keys for the second list of quorum approvers and to concatenate authorization keys to each authentication key. In some instances, sending the one or more commands directing the quorum approver database to store the authentication keys for the second list of quorum approvers and to concatenate authorization keys to each authentication key may cause the quorum approver database to link one or more authorization keys, each granting different permissions, to each of the authentication keys for the second list of quorum approvers.

In one or more instances, the authentication keys may have a temporary period of validity and may identify the quorum approvers. In one or more instances, a first authorization key may grant permission to modify the parent element and a second authorization key may grant permission to modify the sub-element.

In one or more instances, the computing platform may receive an indication of a modification to the sub-element. In one or more instances, the computing platform may prompt, in response to receiving the indication of the modification to the sub-element, for quorum approval.

In one or more instances, the computing platform may determine that the quorum approval exceeds a predetermined quorum threshold. In one or more instances, the quorum approval may be based on quorum approval inputs received from one or more of the quorum approvers.

In one or more instances, a first quorum approval input from a first quorum approver may have equivalent value to a sum of a second quorum approval input and a third quorum approval input from a second quorum approver and a third quorum approver respectively, where the first quorum approver is a manager of the second quorum approver and the third quorum approver.

In one or more instances, the computing platform may perform trust analysis on the quorum approval inputs using one or more machine learning algorithms and datasets to verify the quorum approval inputs. In one or more instances, in response to determining that the quorum approval exceeds the predetermined quorum threshold, the computing platform may generate permission data indicating that computing platform may modify the sub-element, and may store the permission data.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for deploying an enhanced processing system that performs dynamic asset adjustment for blockchain management in accordance with one or more example embodiments;

FIGS. 4A-4C depict an illustrative event sequence for deploying an enhanced processing system that performs bonding of new asset approvers for blockchain management in accordance with one or more example embodiments;

FIGS. 5 and 6 depict example graphical user interfaces for deploying an enhanced processing system that performs asset adjustment, cross sectional editing, and bonding for blockchain management in accordance with one or more example embodiments.

DETAILED DESCRIPTION

Figure 1A:
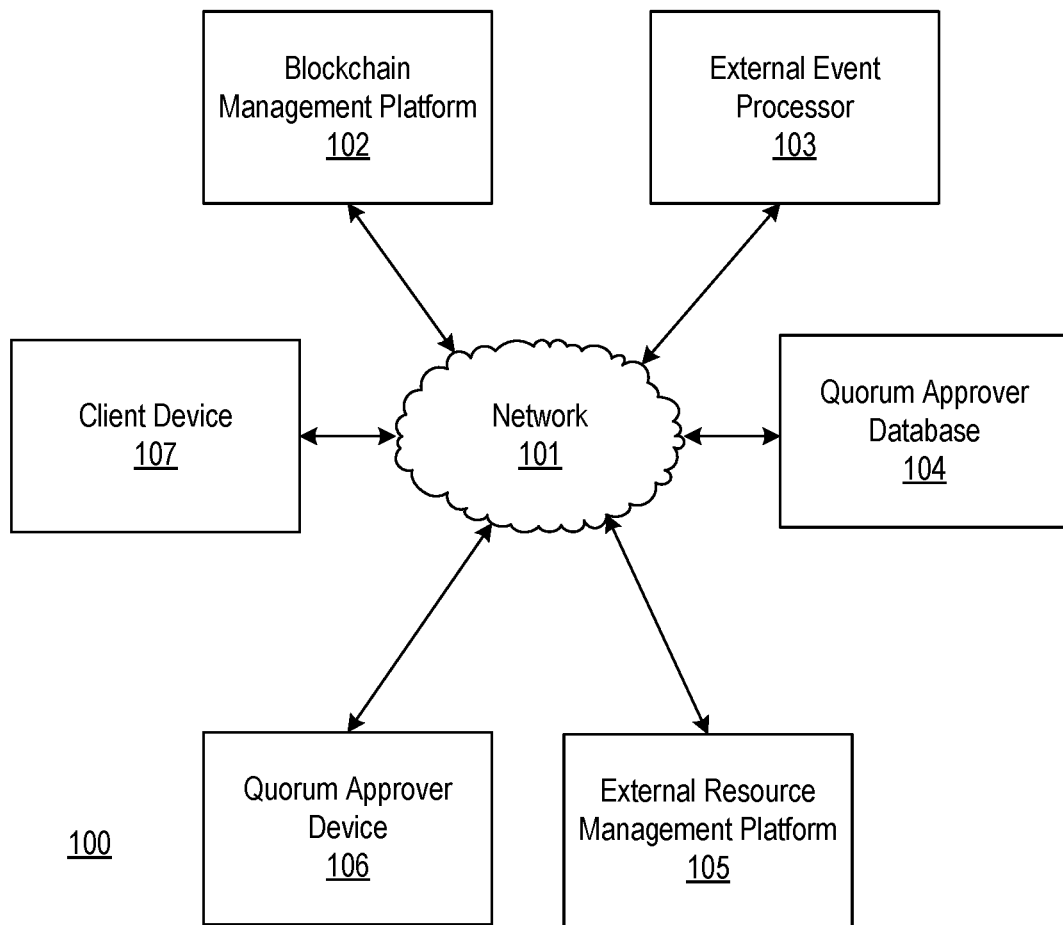
FIGS. 1A and 1B depict an illustrative computing environment for deploying an enhanced processing system that performs asset adjustment, cross sectional editing, and bonding for blockchain management in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

One or more aspects of the disclosure relate to storing asset elements in a blockchain and adjusting these assets to new blocks. In one or more instances, a new block in the blockchain may signify a newly stored and edited data set (e.g., containing details of a stock trade transaction) with the approver quorum validating the modified data against some data record to make sure that the modified data matches expected values (e.g., actual sale price matches anticipated sale price). Each approver may then be able to confirm the data value and inject a tokenized signature inline to confirm the chain. This may be similar to initialing pages of a document before signing the signature page. In some instances, initialing of the pages may signify that approvers have validated each part of the edited data for conformity and correctness.

In one or more instances, new or changing conditions may prompt for adjustment of a preceding block in the chain. These new conditions may be incorporated into the chain, while allowing previous blocks to remain intact. In some instances, this new block in the chain may signify a newly stored and edited data set with the approver quorum validating the modified data against some data record to make sure that the data is changed to expected specifications.

In some instances, to accomplish this goal, a block may be copied with certain alterable parameters while the others may remain locked. The locked down parameters may then be lifted and cloned to the new block with the quorum of users approving or some form of block self-approval.

One example of these aspects may be a repeated asset purchase with varying date, cost, and other parameters. The alterable parameters may follow normal blockchain rules, but may allow a multi-layered thread with each new block going forward. These asset adjustable overlaps may then be repeated over and over with the new block continuing. Each approver may then confirm a data value corresponding to the new block and may inject a tokenized signature to confirm the change. This may be similar to initialing pages of a document before signing the signature pages. By initialing the pages, approvers signify that they have validated the edited data for conformity and correctness.

In some instances, the new block may have the ability to spawn other sub-threads as children to the original blockchain, which may allow inheritance back to the original blockchain. In these instances, a block may be lifted for use and its properties/characteristics changed for on-going blocks for the new threads. The new threads may operate independently and may maintain a different path than the master blockchain. As a result, the master blockchain may continue to exist with its own life but may or might not be designed to have access to the child blockchains. Each child blockchain may also spawn additional sub blockchains.

One or more aspects of the disclosure relate to cross-sectional editing of these blockchain assets. In one or more instances, when attempting to edit a record, an editor may allow only a portion of the record to be edited by a first person. Another part of the record may then be editable only by a second person, and so on. As a result, no one person is able to fully manipulate the entire record. A subset of the data may be lifted above the assets to only show the editable fields of the assets so that the editor does not have access to all of the data within the assets.

One or more aspects of the disclosure relate to bonding of new blockchain approvers. For example, an approver may be replaced by a new approver (e.g., approver left a company, or the like). In one or more instances, a tokenized string may be used to capture the editor details, multi-level approver details, and their approval code. The approval code may be unique and/or randomly generated at the time of change. In one or more instances, the string may be stored inline or as part of a secondary layer/footer and may be used for verification upon receipt. In one or more instances, the blockchain may have a set amount (e.g., five) approvers. Additionally or alternatively, a blockchain asset value may dramatically increase due to addition of high value assets and/or increased sensitivity, and the quorum may be dynamically increased accordingly to match the increased scrutiny and integrity.

Figure 1B:
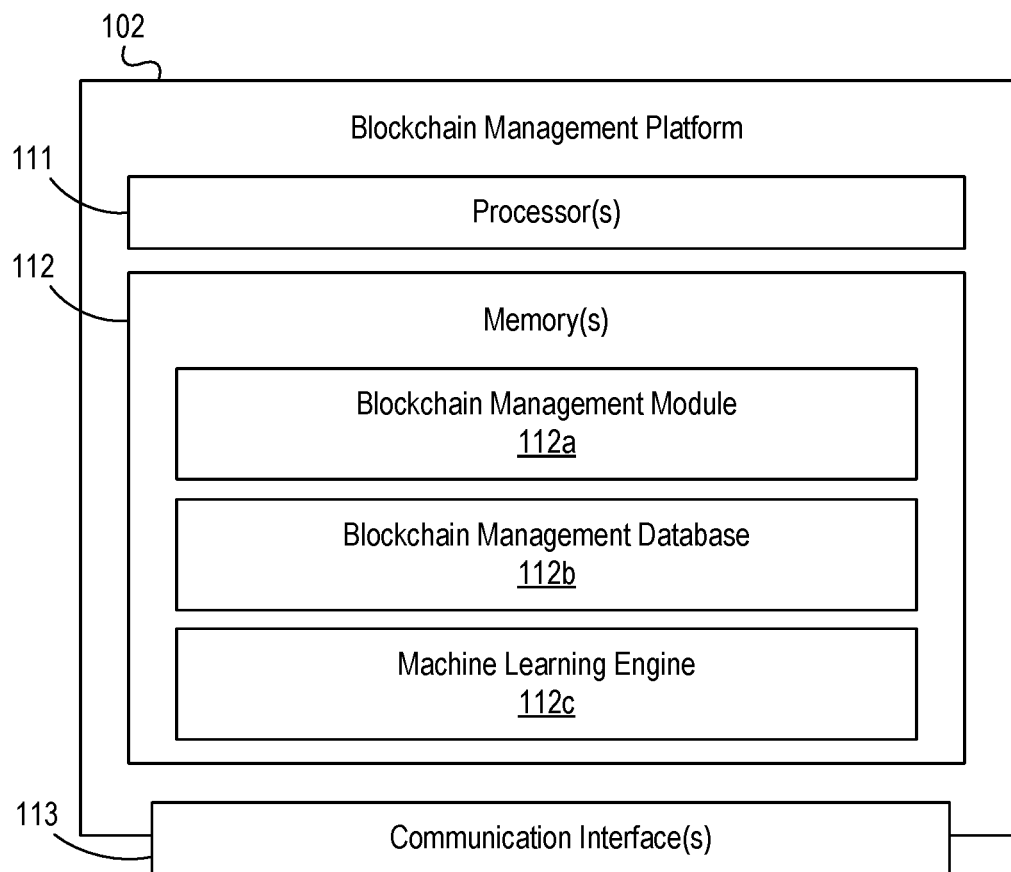

FIGS. 1A-1B depict an illustrative computing environment for deploying an enhanced processing system that performs asset adjustment, cross sectional editing and bonding in accordance with one or more example embodiments. Referring to FIG. 1A, computing environment 100 may include one or more computer systems. For example, computing environment 100 may include a blockchain management platform 102, an external event processor 103, a quorum approver database 104, an external resource management platform 105, a quorum approver device 106, and a client device 107.

As illustrated in greater detail below, blockchain management platform 102 may be a computer system that includes one or more computing devices and/or other computer components (e.g., processors, memories, communication interfaces). In addition, blockchain management platform 102 may be configured to generate and store blockchains, delegate permissions for other computing platforms to modify the blockchains, and/or perform one or more other functions. In one or more instances, the blockchain management platform 102 may modify the blockchains based on client requests (e.g., client requests to sell stock and/or execute other securities trading activities, or the like). In these instances, the blockchain management platform 102 may generate one or more commands directing an external event processor to process an event corresponding to the client requests.

In one or more instances, blockchain management platform 102 may also be configured to generate, host, transmit, and/or otherwise provide graphical user interface information (which may, e.g., cause one or more other computer systems to display and/or otherwise present one or more other graphical user interfaces). In some instances, the graphical user interface information generated by blockchain management platform 102 may be used to generate event processing interfaces (e.g., element split interfaces, quorum approval interfaces, or the like) at one or more other computing devices.

External event processor 103 may be a computer system that includes one or more computing devices (e.g., desktop computers, laptop computers, tablet computers, servers, server blades, or the like) and/or other computer components (e.g., processors, memories, communication interfaces) configured to receive event processing commands and process events (e.g., stock trades, or the like) accordingly. In processing the events, the external event processor 103 may be configured to transfer funds to and/or from one or more financial accounts maintained by a financial institution operating the external event processor 103 based on the events. In these instances, the external event processor 103 may be configured to write to the blockchains stored at the blockchain management platform 102.

Quorum approver database 104 may be a computer system that includes one or more computing devices (e.g., servers, server blades, or the like) and/or other computer components (e.g., processors, memories, communication interfaces) that may be used to store the identities of quorum approvers associated with various events as well as authentication and authorization keys for each quorum approver. In one or more instances, the quorum approver database 104 may store, host, and/or otherwise provide an internal database associated with an institution (e.g., a financial institution). In one or more instances, the quorum approver database 104 may be integrated into the blockchain management platform 102. In other instances, the quorum approver database might not be integrated into the blockchain management platform 102.

External resource management platform 105 may be a computer system that includes one or more computing devices (e.g., servers, server blades, or the like) and/or other computer components (e.g., processors, memories, communication interfaces) that may be used to maintain assets corresponding to the blockchains stored at the blockchain management platform 102. In one or more instances, the external resource management platform 105 may be controlled by a custodian entity, different that the financial institution. In one or more instances, the external resource management platform 105 may be configured to transfer stored assets based on events processed by the external event processor 103. In these instances, the external resource management platform 105 may be configured to write to the blockchains stored at the blockchain management platform 102.

Quorum approver device 106 may include one or more computing devices and/or other computer components (e.g., processors, memories, communication interfaces). Quorum approver device 106 may cause display of and/or otherwise present one or more graphical user interfaces. In some instances, the quorum approval device 106 may be desktop computer, a laptop computer, a tablet, a mobile device, or the like. In some instances, the graphical user interfaces presented by quorum approver device 106 may be quorum approval interfaces. Such graphical user interfaces, for instance, may provide an employee of an organization, such as an employee of a financial institution, with an opportunity to review the event processing performed by the external event processor 103 prior to permitting a transfer of assets by the external resource management platform 105.

Client device 107 may include one or more computing devices and/or other computer components (e.g., processors, memories, communication interfaces). Client device 107 may cause display of and/or otherwise present one or more graphical user interfaces. In some instances, the client device 107 may be desktop computer, a laptop computer, a tablet, a mobile device, or the like. In some instances, the graphical user interfaces presented by client device 107 may be element split interfaces. Such graphical user interfaces, for instance, may provide an individual, such as a customer of a financial institution, with an indication of an event processed by the external event processor 103 and a current state of a blockchain, stored by the blockchain management platform 102, corresponding to the individual's account. For example, the graphical user interfaces may notify the individual of a stock split.

Computing environment 100 also may include one or more networks, which may interconnect blockchain management platform 102, external event processor 103, quorum approver database 104, external resource management platform 105, quorum approver device 106, and client device 107. For example, computing environment 100 may include a network 101 (which may interconnect, e.g., blockchain management platform 102, external event processor 103, quorum approver database 104, external resource management platform 105, quorum approver device 106, and client device 107).

In one or more arrangements, blockchain management platform 102, external event processor 103, quorum approver database 104, external resource management platform 105, quorum approver device 106, and client device 107 may be any type of computing device capable of receiving a user interface, receiving input via the user interface, and communicating the received input to one or more other computing devices. For example, blockchain management platform 102, external event processor 103, quorum approver database 104, external resource management platform 105, quorum approver device 106, client device 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of blockchain management platform 102, external event processor 103, quorum approver database 104, external resource management platform 105, quorum approver device 106, and client device 107 may, in some instances, be special-purpose computing devices configured to perform specific functions.

Referring to FIG. 1B, blockchain management platform 102 may include one or more processors 111, memory 112, and communication interface 113. A data bus may interconnect processor 111, memory 112, and communication interface 113. Communication interface 113 may be a network interface configured to support communication between blockchain management platform 102 and one or more networks (e.g., network 101, or the like). Memory 112 may include one or more program modules having instructions that when executed by processor 111 cause blockchain management platform 102 to perform one or more functions described herein and/or one or more databases that may store and/or otherwise maintain information which may be used by such program modules and/or processor 111. In some instances, the one or more program modules and/or databases may be stored by and/or maintained in different memory units of blockchain management platform 102 and/or by different computing devices that may form and/or otherwise make up blockchain management platform 102. For example, memory 112 may have, host, store, and/or include a blockchain management module 112a, a blockchain management database 112b, and a machine learning engine 112c. Blockchain management module 112a may have instructions that direct and/or cause blockchain management platform 102 to execute advanced asset adjustment, cross sectional editing, and bonding techniques, as discussed in greater detail below. Blockchain management database 112b may store information used by blockchain management module 112a and/or blockchain management platform 102 in executing asset adjustment, cross sectional editing, and bonding techniques and/or in performing other functions. In one or more instances, in executing the asset adjustment, cross sectional editing, and bonding techniques, the blockchain management platform 102 may generate blockchains that may include sub-threads based off a single parent block that may be contain editable parameters controlled by an adjustable list of quorum approvers. Machine learning engine 112c may have instructions that direct and/or cause the blockchain management platform 102 to perform event management and to set, define, and/or iteratively refine optimization rules and/or other parameters used by the blockchain management platform 102 and/or other systems in computing environment 100.

Figure 2B:
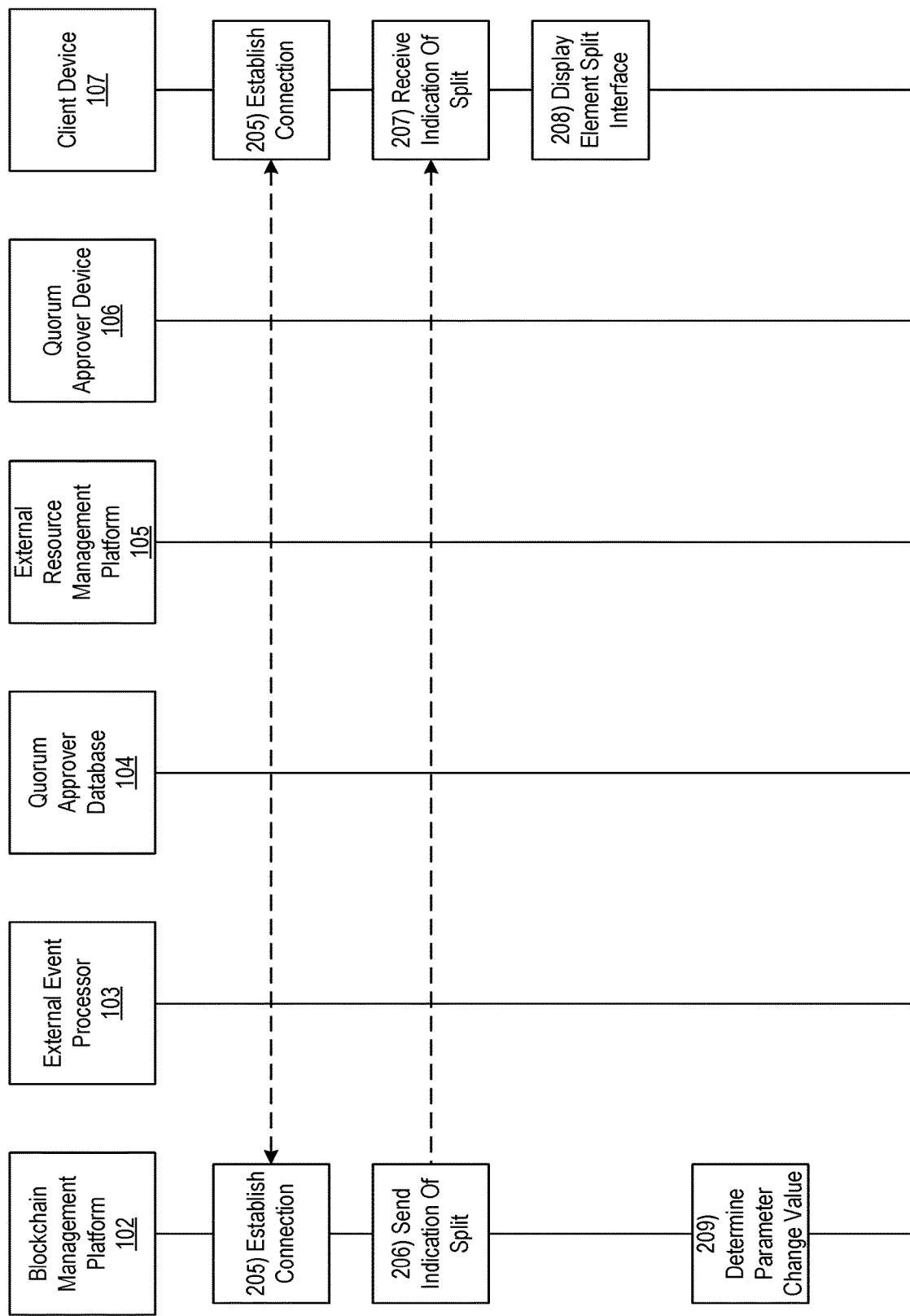

FIGS. 2A-2F depict an illustrative event sequence for deploying an enhanced processing system that performs dynamic asset adjustment for blockchain management in accordance with one or more example embodiments. Referring to FIG. 2A, at step 201, the blockchain management platform 102 may receive an element generation input. In one or more instances, in receiving the element generation input, the blockchain management platform 102 may receive a request to establish an account (e.g., a trading account, a bank account, asset management account, or the like). In these instances, the blockchain management platform 102 may receive the request to establish an account from a client device (e.g., client device 107, or the like) associated with a customer who might not already be registered with an entity associated with the blockchain management platform 102 (e.g., a financial institution, or the like).

At step 202, the blockchain management platform 102 may establish the account and may generate a corresponding blockchain representative of the account. In generating the blockchain, the blockchain management platform 102 may generate a stored element chain, including a parent element. In generating the parent element, the blockchain management platform 102 may generate an element that includes details corresponding to the account (e.g., total account balance, number of shares, or the like).

At step 203, the blockchain management platform 102 may determine to split the parent element into one or more sub-element as part of the blockchain. In one or more instances, the blockchain management platform 102 may determine that the parent element should be split based on new and/or changing conditions (e.g., an asset purchase, a stock split, a stock trade, a transaction, an acquisition, or the like). For example, the blockchain management platform 102 may determine that particular stock, owned by the customer and represented by the parent element of the blockchain, may have split. In this example, the blockchain management platform may determine that a parent element, representative of the original stock, should be split into two sub-elements to reflect the stock split.

At step 204, the blockchain management platform 102 may generate the sub-elements based on the determination at step 204 that the parent element should be split. To follow the example of the stock split described above at step 203, the blockchain management platform 102 may generate a first sub-element and a second sub-element, each linked to the parent element, where the first sub-element and the second sub-element each represent a share of the original stock (which may have been split into two shares). This may allow the blockchain management platform 102 to individually track characteristics and transactions related to each of the two new shares resulting from the stock split.

In one or more instances, in generating the one or more sub-elements, the blockchain management platform 102 may generate one or more sub-elements that may each contain a fixed parameter and a variable parameter. In these instances, the blockchain management platform 102 may generate one or more sub-elements that each contain a parameter that might not be editable and a parameter that may be editable, either by the blockchain management platform 102 or by other computing platforms.

Referring to FIG. 2B, at step 205, the blockchain management platform 102 may establish a connection with the client device 107. In one or more instances, the blockchain management platform 102 may establish a first wireless data connection with the client device 107 to link the blockchain management platform 102 to the client device 107.

At step 206, the blockchain management platform 102 may generate and send an indication of the element split described at step 204. In one or more instances, in generating the indication of the element split, the blockchain management platform 102 may generate one or more commands directing the client device 107 to display an element split interface based on the indication of the element split. In these instances, the blockchain management platform 102 may send the indication of the element split and the one or more commands directing the client device 107 to display the element split interface based on the indication of the element split via the communication interface 113 and while the first wireless data connection is established.

At step 207, the client device 107 may receive the indication of the element split and the one or more commands directing the client device 107 to display the element split interface sent at step 206. In one or more instances, the client device 107 may receive the indication of the element split and the one or more commands directing the client device 107 to display the element split interface while the first wireless data connection is established.

At step 208, based on the one or more commands directing the client device 107 to display the element split received at step 207, the client device 107 may generate and display an element split interface to notify the customer of the element split. In one or more instances, in displaying the element split interface, the client device 107 may display a graphical user interface similar to graphical user interface 505, which is shown in FIG. 5. For example, graphical user interface 505 may include details corresponding to the element split such as an asset identifier, a time of the split, a date of the split, a change in asset value, additional transaction information, or the like.

At step 209, the blockchain management platform 102 may determine a change in the variable parameter for one of the sub-elements. This process is described further below with regard to steps 301-318, but for simplicity and as an example, the blockchain management platform 102 may coordinate a sale of a share represented by the sub-element. The fixed parameter may represent an expected sale price, and the variable parameter may represent an actual sale price. Prior to the sale, the fixed parameter and the variable parameter may be the same, because the blockchain management platform 102 may anticipate receiving the expected sale price. However, due to a time delay associated with the sale, the price may increase or decrease prior to execution of the sale. Following the sale, the blockchain management platform 102 may adjust the variable parameter to reflect the actual sale price. In determining this change, the blockchain management platform 102 may determine the change in the variable parameter.

Figure 2C:
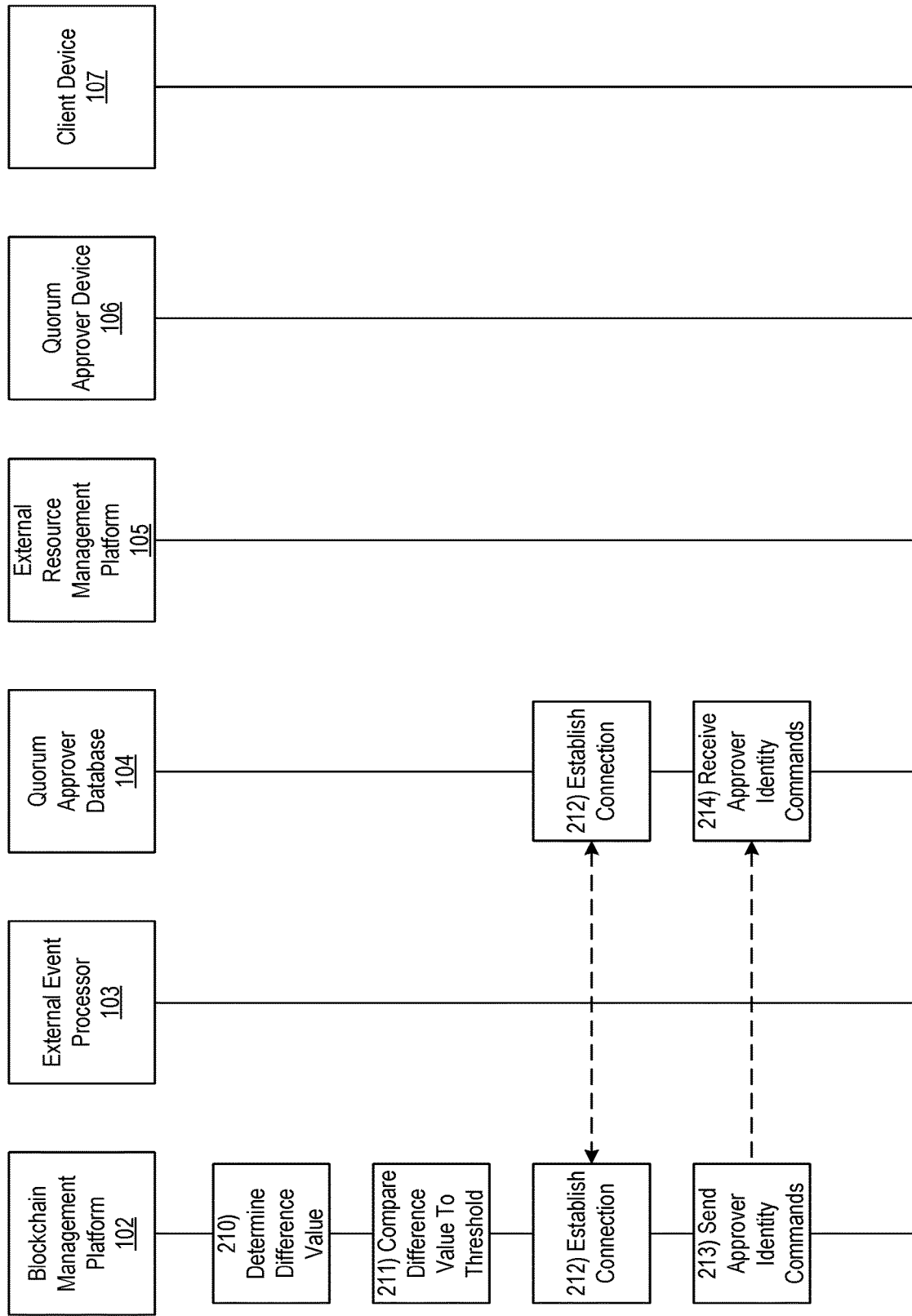

Referring to FIG. 2C, at step 210, the blockchain management platform 102 may determine a difference value between the fixed and variable parameters resulting from the change at step 209. In tracing the stock sale example described above at step 209, the blockchain management platform 102 may determine a difference value between the expected sale price and the actual sale price of the shares.

At step 211, the blockchain management platform 102 may compare the difference value to one or more predetermined discrepancy thresholds to determine a number of quorum approvers for approval of the change. As an example, if the blockchain management platform 102 determines that the difference value does not exceed a first predetermined discrepancy threshold, it may determine a first number of quorum approvers. In this example, if the blockchain management platform 102 determines that the difference value exceeds the first predetermined discrepancy threshold but not a second predetermined discrepancy threshold, it may determine a second number of quorum approvers, higher than the first number of quorum approvers. Further in this example, if the blockchain management platform 102 determines that the difference value exceeds the second number of quorum approvers, it may determine a third number of quorum approvers, higher than the first and second numbers of quorum approvers. As a result, the blockchain management platform 102 may determine a higher number of quorum approvers for difference values corresponding to a larger discrepancy between the actual sale value and the expected sale value. Accordingly, the blockchain management platform 102 may impose stricter management on transactions corresponding to a higher discrepancy between an intended price and an actual sale price to increase accuracy of sales, trades, or the like.

At step 212, the blockchain management platform 102 may establish a connection with the quorum approver database 104. In one or more instances, the blockchain management platform 102 may establish a second wireless data connection with the quorum approver database 104 to link the blockchain management platform 102 to the quorum approver database 104.

At step 213, the blockchain management platform 102 may generate and send one or more commands directing the quorum approver database 104 to provide quorum identity information based on the sub-element. In one or more instances, the blockchain management platform 102 may send the one or more commands directing the quorum approver database 104 to provide quorum identity information based on the sub-element via the communication interface 113 and while the second wireless data connection is established.

At step 214, the quorum approver database 104 may receive the one or more commands directing the quorum approver database 104 to provide quorum identity information based on the sub-element. In one or more instances, the quorum approver database 104 may receive the one or more commands directing the quorum approver database 104 to provide quorum identity information based on the sub-element while the second wireless data connection is established.

Figure 2D:
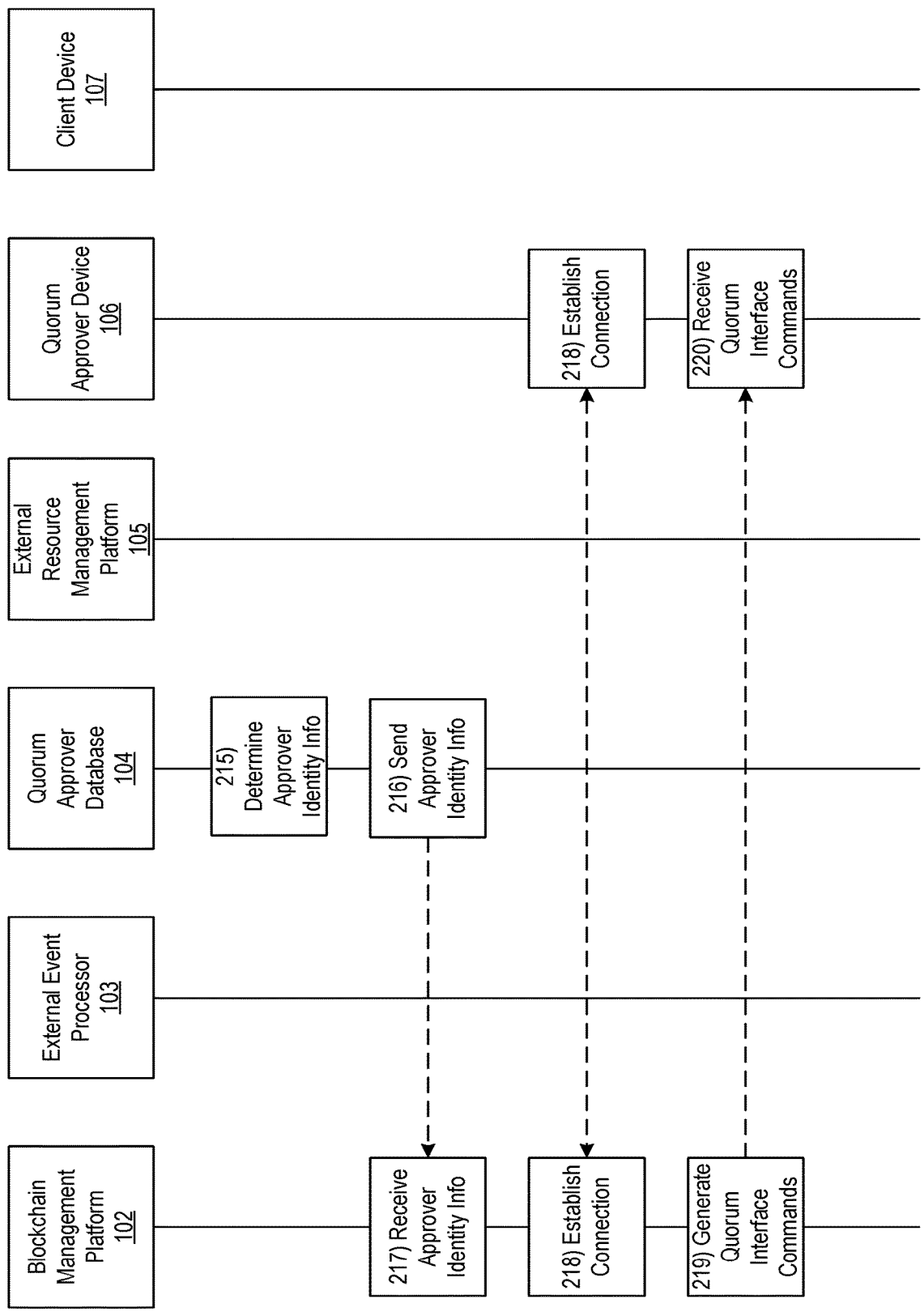

Referring to FIG. 2D, at step 215, the quorum approver database 104 may determine quorum approver identity information corresponding to the sub-element. In one or more instances, the quorum approver database may maintain a listing of element identifiers and quorum approvers corresponding to each element identifier. In determining the quorum approver identity information, the quorum approver database 104 may determine an indication of one or more quorum approver devices (e.g., quorum approver device 106, or the like), that correspond to the sub-element identified in the commands received at step 214.

At step 216, after determining the quorum approver identity information corresponding to the sub-element, the quorum approver database 104 may send the quorum approver identity information to the blockchain management platform 102. In one or more instances, the quorum approver database 104 may send the quorum approver identity information to the blockchain management platform 102 while the second wireless data connection is established.

At step 217, the blockchain management platform 102 may receive the quorum approver identity information corresponding to the sub-element. In one or more instances, the blockchain management platform 102 may receive the quorum approver identity information corresponding to the sub-element via the communication interface 113 and while the second wireless data connection is established.

At step 218, the blockchain management platform 102 may establish a connection with a quorum approver device identified in the quorum approver identity information received at step 217. Although step 218 shows the blockchain management platform 102 establishing a connection only with quorum approver device 106, it should be understood that this is merely exemplary, and that the blockchain management platform 102 may establish a connection with each quorum approver device identified in the quorum approver identity information. In one or more instances, the blockchain management platform 102 may establish a third wireless data connection with the quorum approver device 106 to link the blockchain management platform 102 to the quorum approver device 106.

At step 219, the blockchain management platform 102 may generate and send quorum interface information and one or more commands directing the quorum approver device 106 to generate a quorum approval interface based on the quorum interface information. In one or more instances, the blockchain management platform 102 may send the quorum interface information and one or more commands directing the quorum approver device 106 to generate the quorum approval interface based on the quorum interface information via the communication interface 113 and while the third wireless data connection is established.

At step 220, quorum approver device 106 may receive the quorum interface information and one or more commands directing the quorum approver device 106 to generate a quorum approval interface based on the quorum interface information sent at step 219. In one or more instances, the quorum approver device 107 may receive quorum interface information and one or more commands directing the quorum approver device 106 to generate a quorum approval interface based on the quorum interface information while the third wireless data connection is established.

Figure 2E:
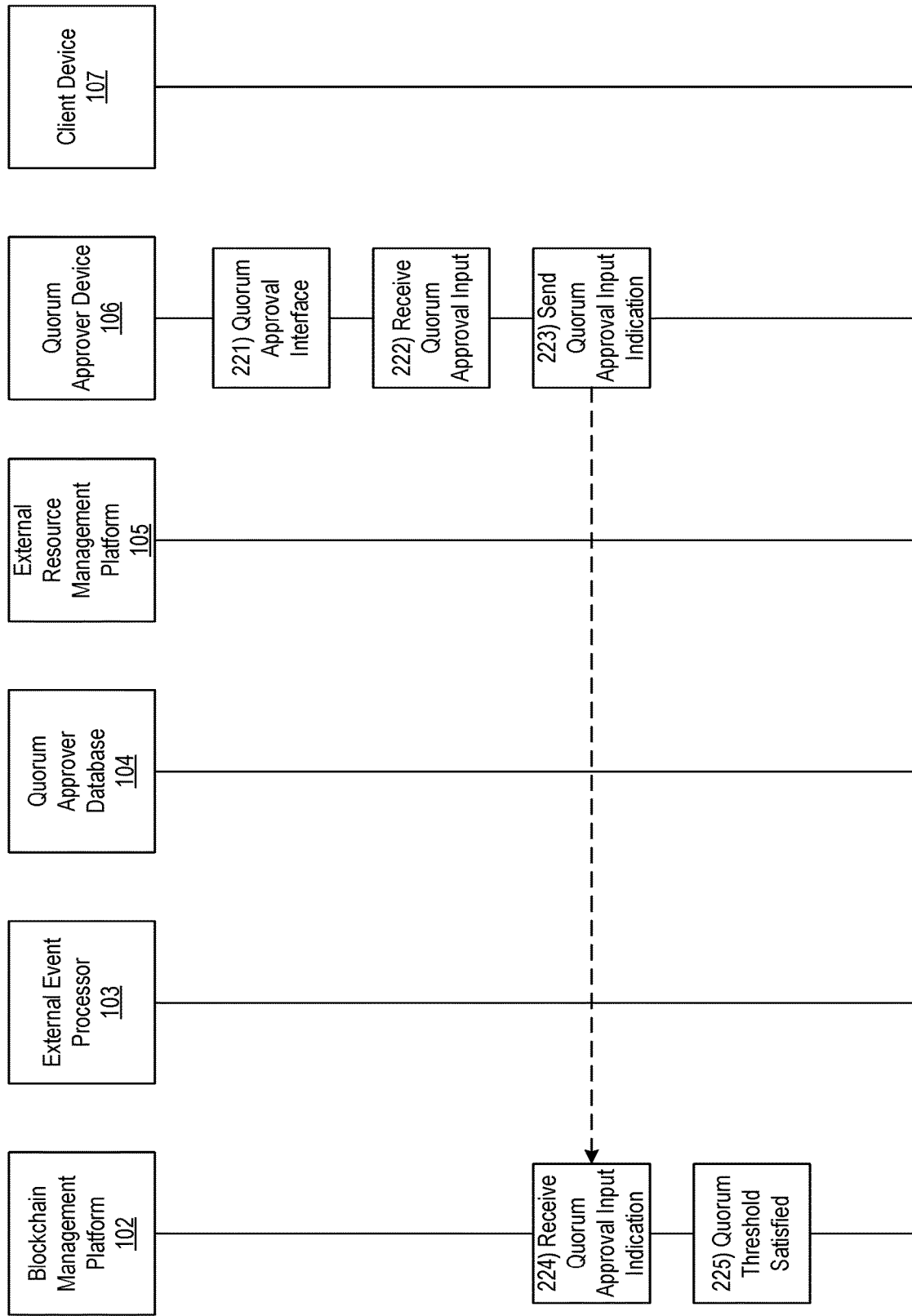

Referring to FIG. 2E, at step 221, the quorum approver device 106 may generate and display a quorum approval interface using the quorum interface information received at step 220. In displaying the quorum approval interface, the quorum approver device 106 may display a graphical user interface similar to graphical user interface 605, which is shown in FIG. 6. In one or more instances, in displaying the quorum approval interface, the quorum approver device 106 may display an indication of the difference value determined at step 210, and may prompt a quorum approver to provide a quorum approval input, indicating that the difference value is acceptable. It should be understood that the quorum approval input may also be provided automatically (e.g., by the quorum approver device 106 using one or more machine learning algorithms and datasets).

At step 222, the quorum approver device 106 may receive a quorum approval input. In one or more instances, the quorum approver device 106 may receive the quorum approval input by receiving one or more of a voice command, a gesture input, a touch input, or the like indicating that the difference value is acceptable. Returning to the example of the stock sale, the quorum approval input may indicate that the actual sale price is close enough to the expected sale price for the transaction to be completed.

At step 223, after receiving the quorum approval input, the quorum approver device 106 may a send quorum approval indication to the blockchain management platform 102 indicating the quorum approval input received at step 222. In one or more instances, the quorum approver device 106 may send the quorum approval input indication to the blockchain management platform 102 while the third wireless data connection is established.

At step 224, the blockchain management platform 102 may receive the quorum approval input indication sent at step 223. In one or more instances, the blockchain management platform may receive the quorum approval input indication via the communication interface 113 and while the third wireless data connection is established.

At step 225, the blockchain management platform 102 may determine whether a quorum approval threshold is satisfied. In one or more instances, in determining whether the quorum approval threshold is satisfied, the blockchain management platform 102 may determine whether a sufficient number of quorum approval inputs have been received to exceed the quorum approval threshold. For example, the quorum approval threshold may correspond to five quorum approval inputs. Thus, in this example, once five quorum approval inputs are received, the quorum approval threshold may be satisfied. In this example, the first quorum approval input may be received from the quorum approver device 106 and the blockchain management platform 102 may wait until additional quorum approver inputs are received (e.g., in excess of the quorum approval threshold of five) before proceeding. Although the event sequence depicts a single quorum approver device 106, it should be understood that in one or more instances, there may be multiple other quorum approval devices similar to quorum approver device 106 that may be used by different quorum approvers but may perform similar functions to those described with regard to quorum approver device 106 in prompting their corresponding quorum approver to provide a quorum approver input. If the blockchain management platform 102 determines that the quorum approval threshold is not satisfied, the blockchain management platform 102 may return to step 224 to receive additional quorum approval input indications. If the blockchain management platform 102 determines that the quorum approval threshold is satisfied, the blockchain management platform 102 may proceed to step 226.

Figure 2F:
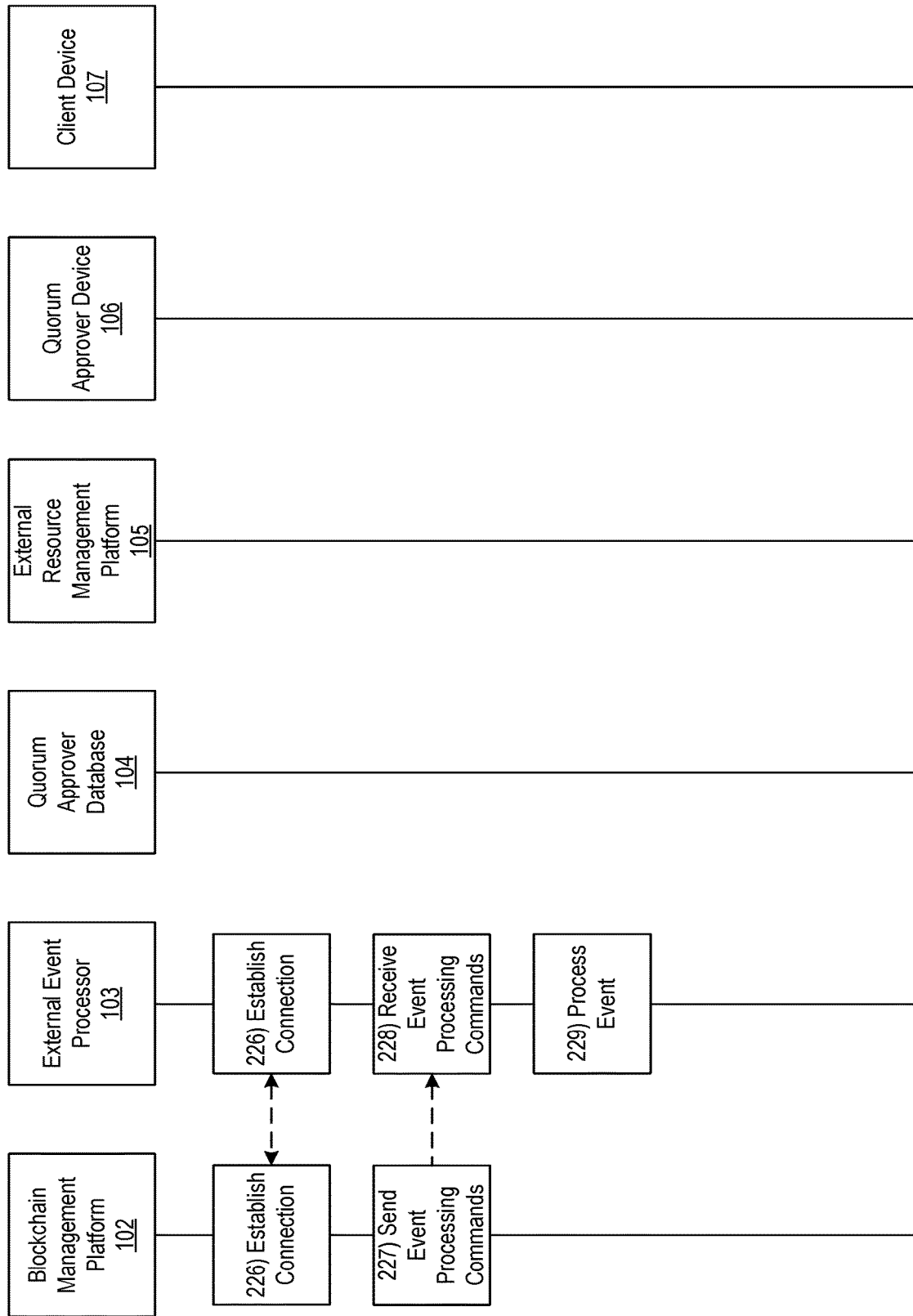

Referring to FIG. 2F, at step 226, the blockchain management platform 102 may establish a connection with an external event processor 103. In one or more instances, the blockchain management platform 102 may establish a fourth wireless data connection with the external event processor 103 to link the blockchain management platform 102 to the external event processor 103.

At step 227, the blockchain management platform 102 may generate and send one or more commands directing the external event processor 103 to process an event corresponding to the change in the variable parameter. For example, the event may be the transaction, sale, trade, or the like that caused the change in the variable parameter. In one or more instances, the blockchain management platform 102 may generate and send the one or more commands directing the external event processor 103 to process an event corresponding to the change in the variable parameter via the communication interface 113 and while the fourth wireless data connection is established.

At step 228, the external event processor 103 may receive the one or more commands directing the external event processor 103 to process an event corresponding to the change in the variable parameter sent at step 227. In one or more instances, the external event processor 103 may receive the one or more commands directing the external event processor 103 to process an event corresponding to the change in the variable parameter while the fourth wireless data connection is established.

At step 229, in response to the one or more commands directing the external event processor 103 to process an event corresponding to the change in the variable parameter received at step 228, the external event processor 103 may process the event. In one or more instances, in processing the event, the external processor 103 may cause a payment, transfer of assets, trade, or the like to be executed.

Subsequently, the event sequence may end, and the blockchain management platform 102 may continue to maintain a dynamically adjustable blockchain containing sub-elements configured with fixed and variable parameters. By maintaining such a blockchain, representative of a customer account, the blockchain management platform 102 may improve account management by being able to track original parameters associated with the account through parent blocks and to track transactions involving various account assets through sub-elements and threads. Furthermore, by implementing a variable parameter into the sub-elements, the blockchain management platform 102 may improve transaction management by providing a mechanism by which an expected sale price may be compared to an actual sale price, and finalizing the transaction once a difference between these prices has been approved by an appropriate number of quorum approvers.

Figure 3A:
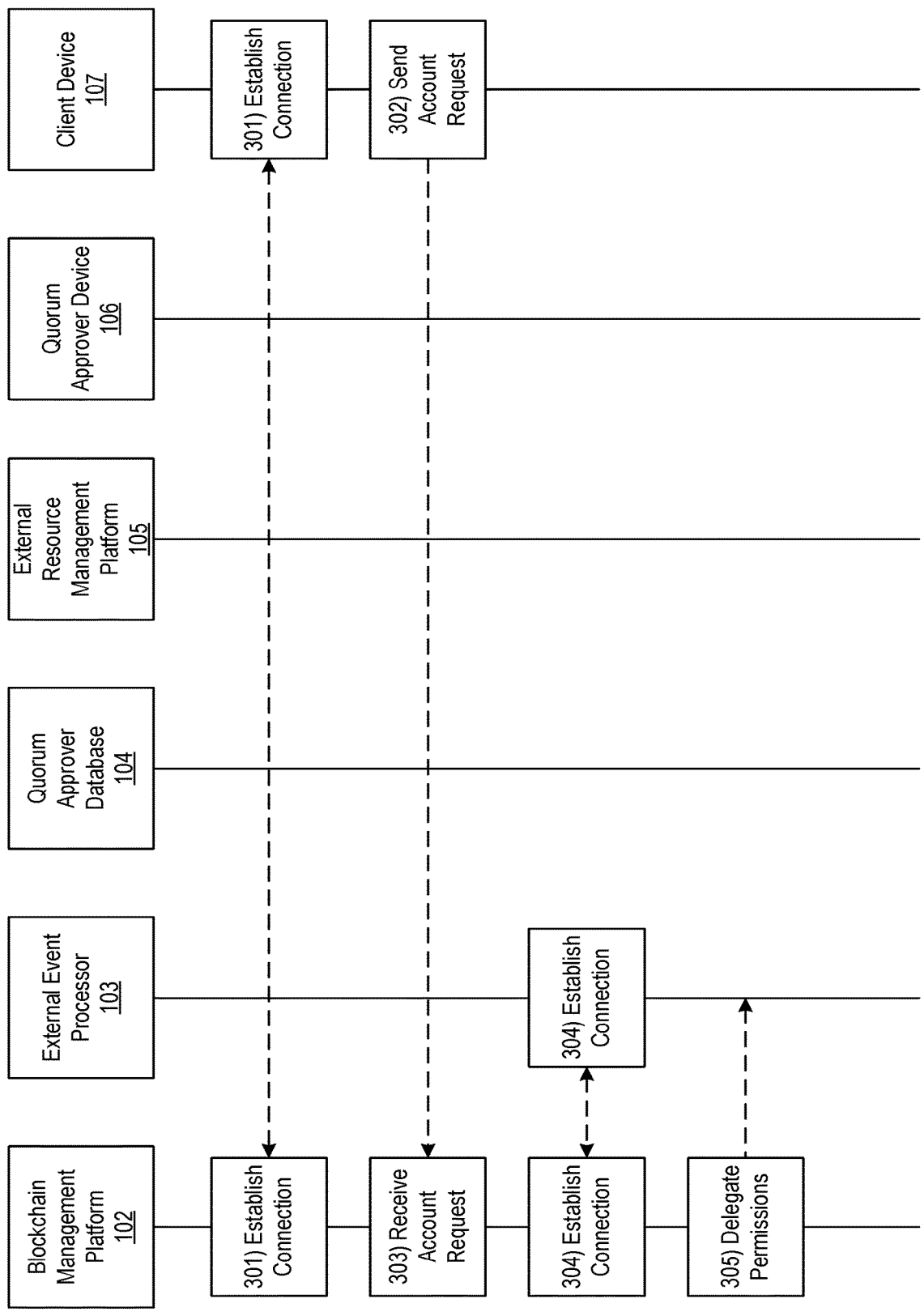
FIGS. 3A-3F depict an illustrative event sequence for deploying an enhanced processing system that performs cross sectional asset editing for blockchain management in accordance with one or more example embodiments.

FIGS. 3A-3F depict an illustrative event sequence for deploying an enhanced processing system that performs cross sectional asset editing for blockchain management in accordance with one or more example embodiments. It should be understood that the event sequence illustrated in FIGS. 3A-3F may be performed in addition to, as a portion of, or as an alternative to the event sequence described above with regard to FIGS. 2A-2F. Referring to FIG. 3A, blockchain management platform 102 may establish a connection with a client device 107. In one or more instances, the blockchain management platform 102 may establish a first wireless data connection with the client device 107 to link the blockchain management platform 102 to the client device 107.

At step 302, the client device 107 may generate and send a request to establish an account. In one or more instances, in sending the request to establish an account (e.g., a financial account, a trading account, an asset management account, or the like), the client device 107 may delegate permission to the blockchain management platform 102 to perform a first subset of actions corresponding to the account, and may include permissions for one or more additional computing platforms to perform a remainder of the actions corresponding to the account. In one or more instances, the first subset of actions may include generation and maintenance of a stored blockchain corresponding to the account. In one or more instances, the client device 107 may send the request to establish the account while the first wireless data connection is established.

At step 303, the blockchain management platform 102 may receive the request to establish the account, including the delegation of permissions, sent at step 302. In one or more instances, the blockchain management platform 102 may receive the request to establish the account via the communication interface and while the first wireless data connection is established.

At step 304, the blockchain management platform 102 may establish a connection with an external event processor 103. In one or more instances, the blockchain management platform 102 may establish a second wireless data connection with the external event processor 103 to link the blockchain management platform 102 to the external event processor 103.

At step 305, the blockchain management platform 102 may delegate a second subset of permissions, as indicated in the account request received at step 302, to the external event processor 103. In one or more instances, in delegating the second subset of permissions, the blockchain management platform 102 may delegate permission for the external event processor 103 to execute events corresponding to subsequent account requests (e.g., requests to trade securities and/or other assets, sell securities and/or other assets, buy securities and/or other assets, or the like). In these instances, the blockchain management platform 102 may generate permission data indicating the second subset of permissions, and may send the permission data indicating the second subset of permissions to the external event processor 103. In one or more instances, in delegating the second subset of permissions, the blockchain management platform 102 may send the permission data indicating the second subset of permissions via the communication interface 113 and while the second wireless data connection is established.

Figure 3B:
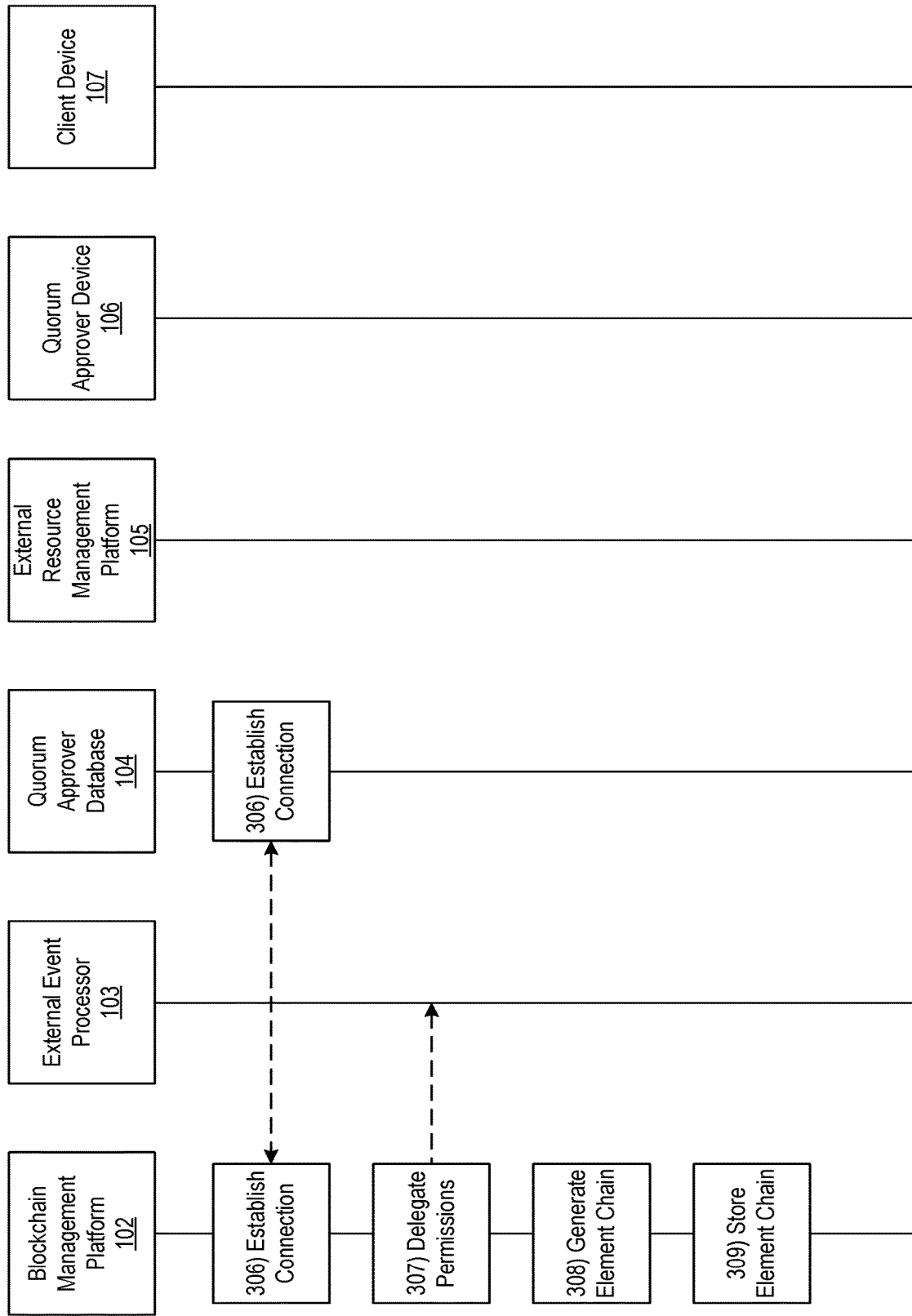

Referring to FIG. 3B, at step 306, the blockchain management platform 102 may establish a connection with a quorum approver database 104. In one or more instances, the blockchain management platform 102 may establish a third wireless data connection with the quorum approver database 104 to link the blockchain management platform 102 to the quorum approver database 104.

At step 307, the blockchain management platform 102 may delegate a third subset of permissions, as indicated in the account request received at step 302, to the quorum approver database 104. In one or more instances, in delegating the third subset of permissions, the blockchain management platform 102 may delegate permission for the quorum approver database to maintain and transfer assets (e.g., stocks, money, additional assets, or the like) corresponding to subsequent account requests. In these instances, the blockchain management platform 102 may generate permission data indicating the third subset of permissions, and may send the permission data indicating the third subset of permissions to the quorum approver database 104. In one or more instances, in delegating the third subset of permissions, the blockchain management platform 102 may send the permission data indicating the third subset of permissions via the communication interface 113 and while the third wireless data connection is established.

At step 308, the blockchain management platform 102 may generate a blockchain (e.g., an element chain) corresponding to the account. In one or more instances, in generating the blockchain, the blockchain management platform 102 may generate a parent element corresponding to the account that may include, e.g., a total value of the account and a listing of all assets in the account (e.g., stocks, bonds, cash, other assets, or the like).

At step 309, the blockchain management platform 102 may store the blockchain generated at step 308 along with other blockchains. In some instances, the other blockchains may correspond to other clients. In one or more instances, some of the other blockchains may correspond to the same client.

Figure 3C:
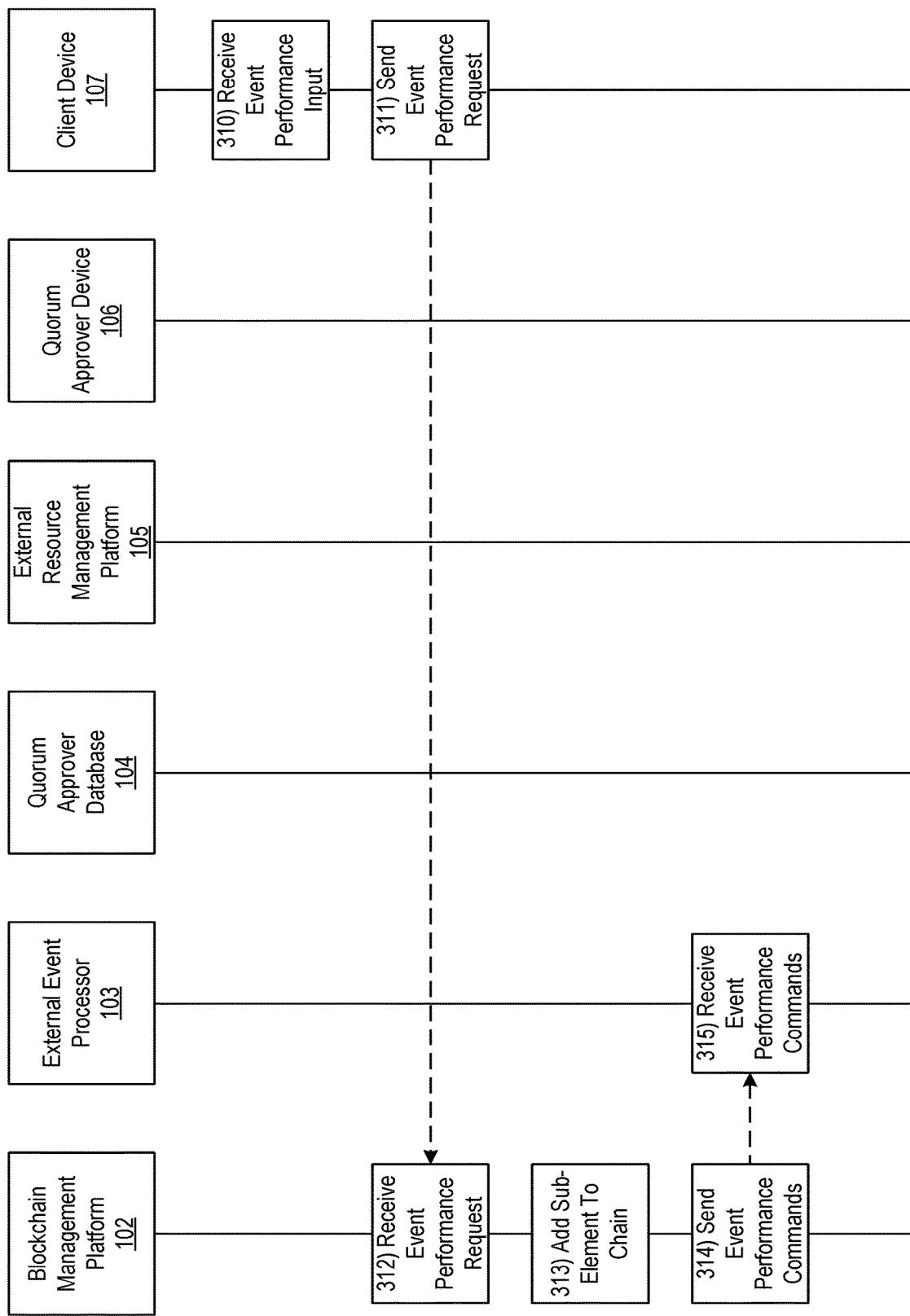
Figure 3D:
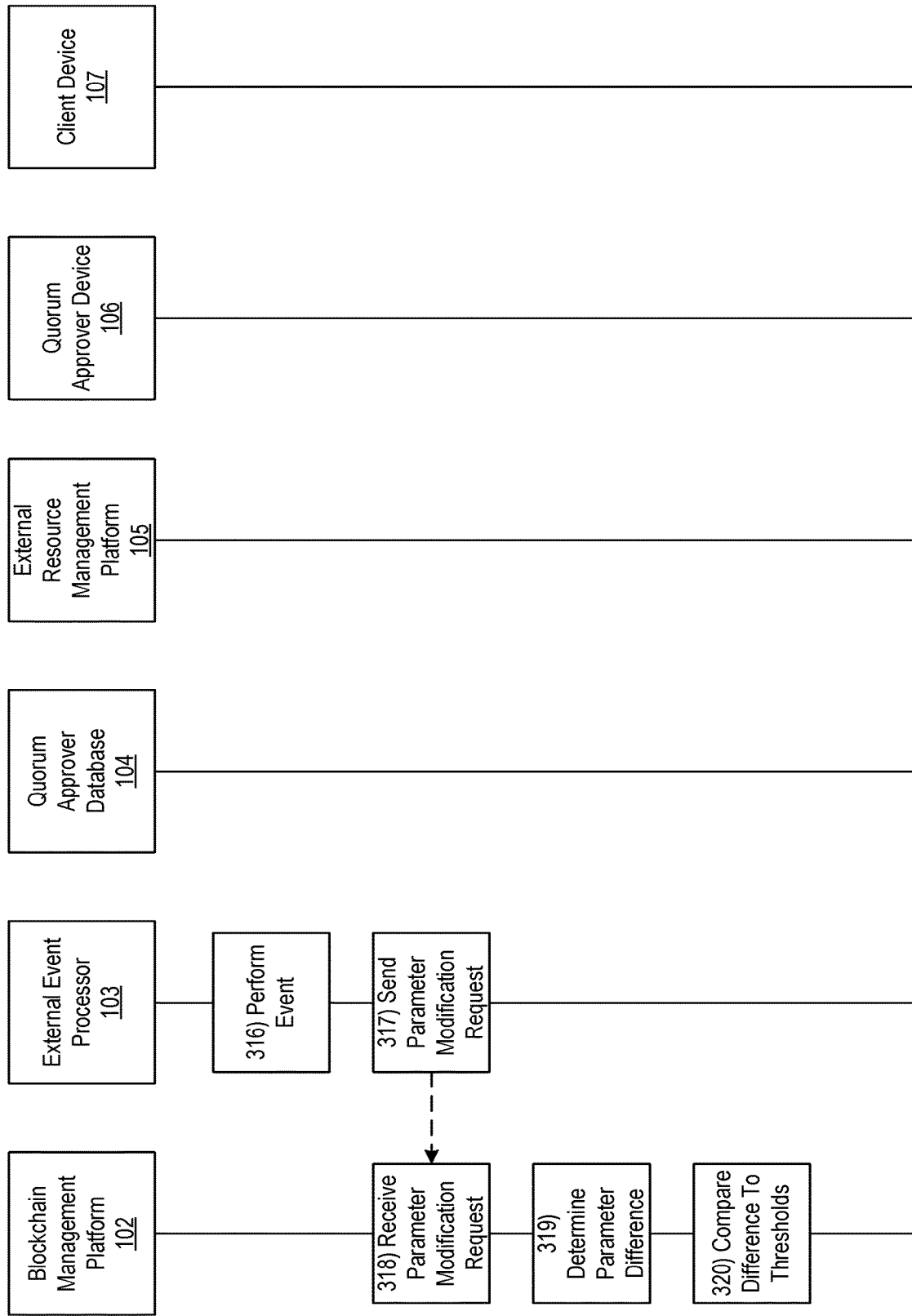

Referring to FIG. 3C, at step 310, the client device 107 may receive an input requesting performance of an event (e.g., a sale, a trade, a purchase, asset transfer, or the like). In one or more instances, the client device 107 may receive the input requesting performance of the event via a display of the client device 107.

At step 311, the client device 107 may send a request to cause performance of the event to the blockchain management platform 102. In one or more instances, the client device 107 may send the request to cause performance of the event while the first wireless data connection is established.

At step 312, the blockchain management platform 102 may receive the request to cause performance of the event from the client device 107. In one or more instances, the blockchain management platform 102 may receive the request to cause performance of the event via the communication interface 113 and while the first wireless data connection is established.

At step 313, the blockchain management platform 102 may determine, based on the request to cause performance of the event, that a sub-element should be added to the blockchain that is linked to the parent element. As described above with regard to step 208, in generating the sub-element, the blockchain management platform 102 may generate a sub-element that contains a fixed parameter and a variable parameter. As an example, assuming that the request to cause performance of the event received at step 312 was a request to sell one or more shares of stock, the blockchain management platform 102 may generate the sub-element to track the sale, and the fixed parameter and the variable parameter may represent an expected sale price and an actual sale price of the shares respectively.

At step 314, the blockchain management platform 102 may generate and send one or more commands directing the external event processor 103 to process the event (e.g., sell the shares). In one or more instances, the blockchain management platform 102 may send the one or more commands directing the external event processor 103 to process the event via the communication interface 113 and while the second wireless data connection is established.

At step 315, the external event processor 103 may receive the one or more commands directing the external event processor 103 to process the event. In one or more instances, the external event processor 103 may receive the one or more commands directing the external event processor 103 to process the event while the second wireless data connection is established.

Referring to FIG. 2D, at step 316, the external event processor 103 may perform the event based on the commands received at step 315. In performing the event, the external event processor 103 may execute a trade, sale, payment, purchase, transfer, or the like relating to assets in the account or prospective assets for the account. In one or more instances, although the external event processor 103 may execute the event, the external event processor might not have permission to cause a transfer of the actual assets (e.g., this permission may be delegated to the external resource management platform 105, which may perform a custodial function with regard to the assets).

At step 317, once the external event processor 103 performs the event, it may generate and send a request for the blockchain management platform 102 to modify the variable parameter of the sub-element based on the actual value of the event performed at step 316. For example, in one or more instances, there may be a delay between steps 312 (when performance of the event is requested) and 316 (when performance of the event actually occurs). Thus, an expected value corresponding to performance of the event might be different than an actual value corresponding to performance of the event (e.g., a stock value may fluctuate between the time a client requests a trade and the trade is actually executed). In one or more instances, the external event processor 103 may send the request to modify the variable parameter of the sub-element based on the actual value of the event performed while the second wireless data connection is established.

At step 318, the blockchain management platform 102 may receive the request to modify the variable parameter of the sub-element based on the actual value of the event performed. Accordingly, the blockchain management platform 102 may modify the variable parameter of the sub-element accordingly, and store the modified variable parameter at the sub-element. By modifying the variable parameter of the sub-element in response to the request to modify the variable parameter from the external event processor 103, the blockchain management platform 102 may effectively allow the external event processor 103 to write to the variable parameter of the sub-element of the blockchain. In these instances, the permissions delegated to the external event processor 103 at step 305 may have included permission to write to the variable parameter of the sub-element of the blockchain.

At step 319, the blockchain management platform 102 may determine a difference value between the fixed parameter and the modified variable parameter for the sub-element. In one or more instances, this may entail the blockchain management platform 102 determining a difference between an expected sale price and an actual sale price of one or more shares of stock. Actions performed at step 319 may be similar to those recited above with regard to step 210.

At step 320, the blockchain management platform 102 may compare the difference value between the fixed parameter and the modified variable parameter for the sub-element to one or more predetermined thresholds to determine a number of quorum approvers for the sub element. Actions performed at step 320 may be similar to those recited above with regard to step 211.

Figure 3E:
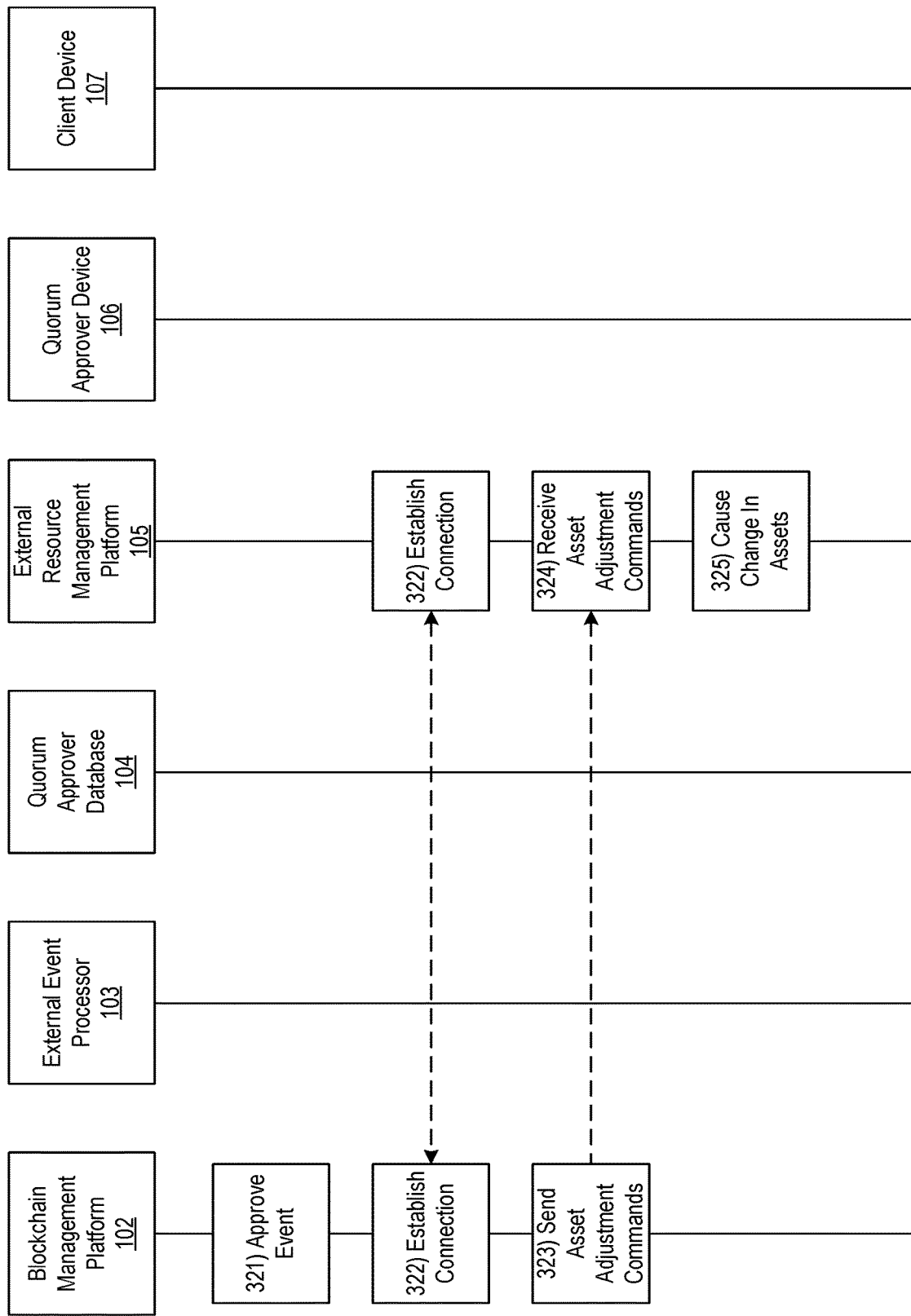

Referring to FIG. 3E, at step 231, the blockchain management platform 102 may approve processing of the event. In one or more instances, the blockchain management platform 102 may approve processing of the event by performing actions similar to those described above with regard to steps 212-225.

At step 322, the blockchain management platform 102 may establish a connection with an external resource management platform 105. In one or more instances, the blockchain management platform 102 may establish a fourth wireless data connection with the external resource management platform 105 to link the blockchain management platform 102 to the external resource management platform 105.

At step 323, the blockchain management platform 102 may generate and send one or more commands directing the external resource management platform 105 to cause a change in assets based on the variable parameter. For example, in sending the one or more commands directing the external resource management platform 105 to cause the change in assets based on the variable parameter, the blockchain management platform 102 may direct the external resource management platform 105 to transfer funds, stock certificates, or the like corresponding to the event approved at step 321. In one or more instances, the blockchain management platform 102 may send the one or more commands directing the external resource management platform 105 to cause a change in assets based on the variable parameter via the communication interface 113 and while the fourth wireless data connection is established.

At step 324, the external resource management platform 105 may receive the one or more commands directing the external resource management platform 105 to cause a change in assets based on the variable parameter. In one or more instances, the external resource management platform 105 may receive the one or more commands directing the external resource management platform 105 to cause a change in assets based on the variable parameter while the fourth wireless data connection is established.

At step 325, in response to the commands received at step 324, the external resource management platform 105 may cause a change in assets (e.g., funds, stock certificates, or the like). As a result, the external resource management platform 105 may cause a change in the total value of the account represented by the blockchain stored at the blockchain management platform 102.

Figure 3F:
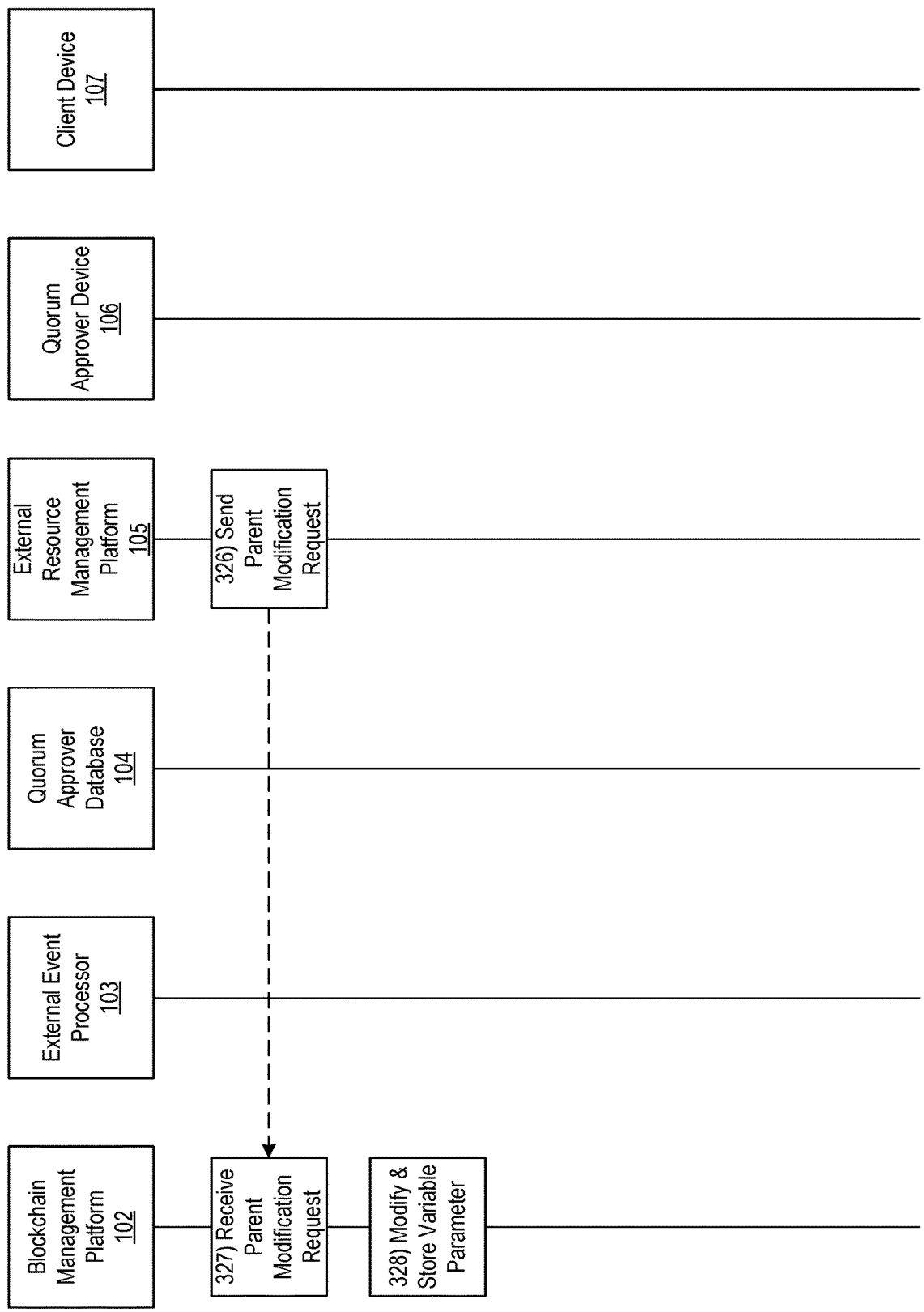

Referring to FIG. 3F, at step 326, the external resource management platform 105 may generate and send a request for the blockchain management platform 102 to modify a variable parameter of the parent node based on the modified total value of the account. In one or more instances, the external resource management platform 105 may send the request for the blockchain management platform 102 to modify a variable parameter of the parent node based on the modified total value of the account while the fourth wireless data connection is established.

At step 327, the blockchain management platform 102 may receive the request for the blockchain management platform 102 to modify a variable parameter of the parent node based on the modified total value of the account. In one or more instances, the blockchain management platform 102 may receive the request for the blockchain management platform 102 to modify a variable parameter of the parent node based on the modified total value of the account via the communication interface 113 and while the fourth wireless data connection is established.

At step 328, in response to receiving the request for the blockchain management platform 102 to modify a variable parameter of the parent node based on the modified total value of the account, the blockchain management platform 102 may modify and store the variable parameter of the parent element based on the modified total value of the account. In doing so, the blockchain management platform 102 may effectively grant the external resource management platform 105 the ability to write to the stored blockchain. Referring back to the exemplary stock sale discussed throughout, once the stock is sold, a value of the funds used to purchase the stock may be added to the client's account and the variable parameter of the parent node in the blockchain may be modified to reflect these additional funds.

Subsequently, the event sequence may end, and the blockchain management platform 102 may continue to maintain a blockchain that may be edited at different levels by different entities and/or computing platforms. By granting such different permissions to various computing platforms to edit portions of the blockchain but not others, the blockchain management platform may maintain the integrity of the blockchain while also increasing accuracy of the stored parameters by allowing dynamic, on the fly editing by multiple computing platforms that are performing different portions of an event processing sequence.

Figure 4A:
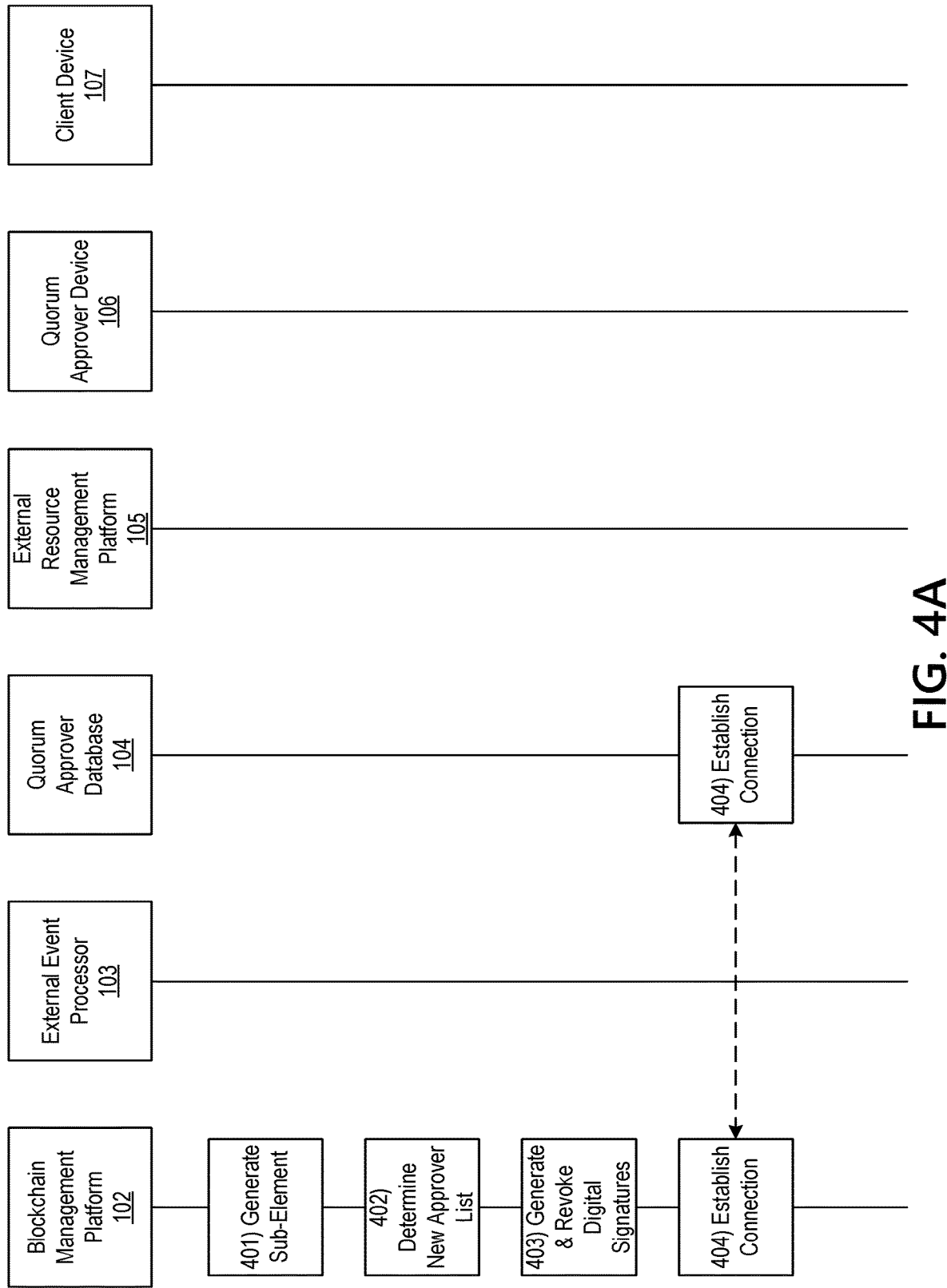
Figure 4B:
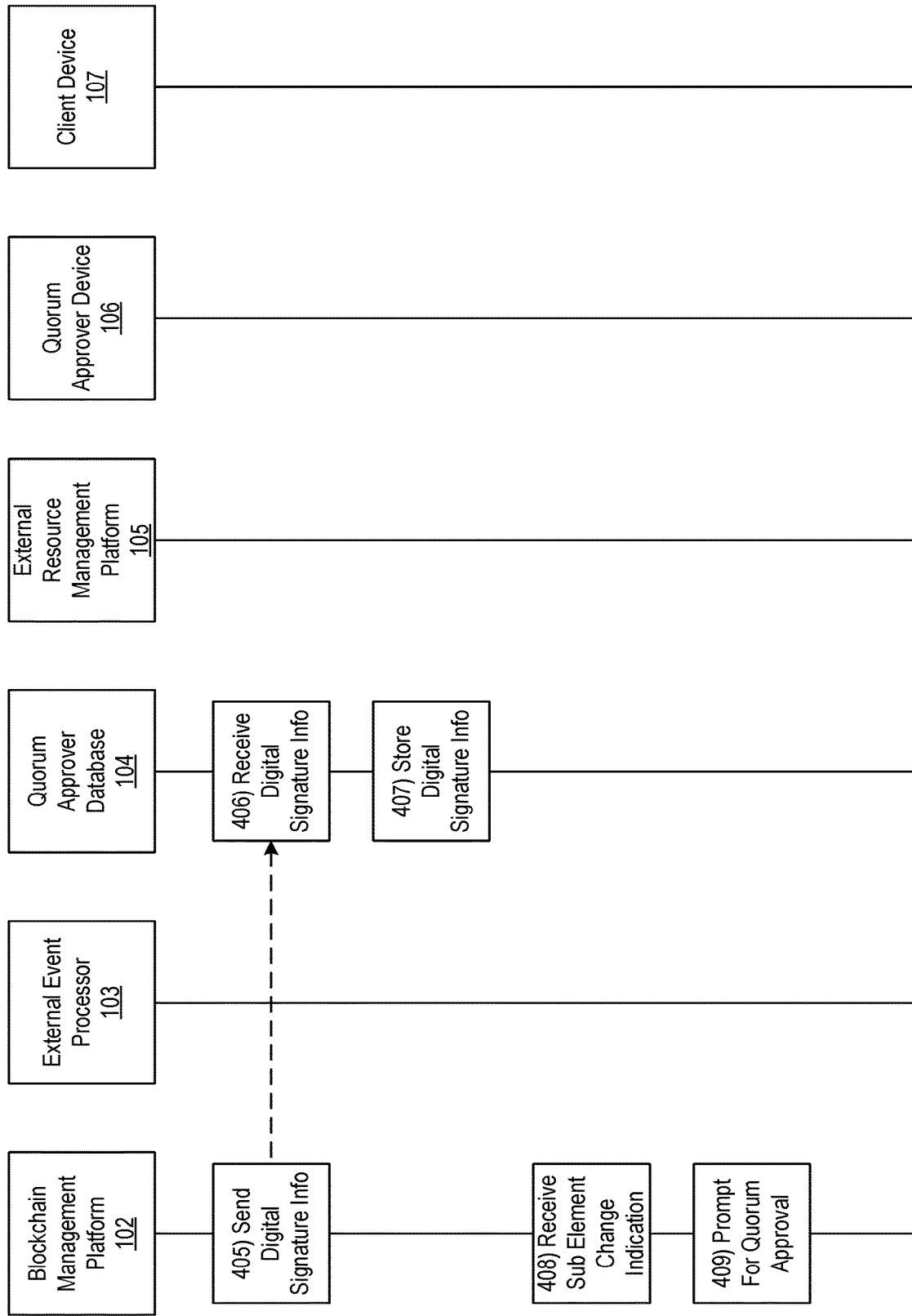

FIGS. 4A-4C depict an illustrative event sequence for deploying an enhanced processing system that performs bonding of new asset approvers for blockchain management in accordance with one or more example embodiments. It should be understood that the event sequence illustrated in FIGS. 4A-4C may be performed in addition to, as a portion of, or as an alternative to the event sequence described above with regard to FIGS. 2A-2F and 3A-3F. Referring to FIG. 4A, at step 401, the blockchain management platform 102 may generate a sub-element based on a parent element in a blockchain.

At step 402, the blockchain management platform 102 may determine that a list of quorum approvers for the sub-element should be different than a list of quorum approvers for the parent element. For example, the blockchain management platform 102 may determine that members of the list of quorum approvers for the parent element have left the company, new employees have joined the company, a merger of multiple companies has occurred, a change in value of assets corresponding to the blockchain has occurred, or the like.

At step 403, the blockchain management platform 102 may generate digital signatures for the new approvers and revoke digital signatures for approvers to be removed. In one or more instances, in generating the digital signatures, the blockchain management platform 103 may generate an authentication token corresponding to each approver. In one or more instances, in generating the digital signatures, the blockchain management platform 103 may generate temporary digital signatures with a predetermined duration of validity. Additionally or alternatively, the blockchain management platform 103 may generate the authentication tokens and/or the digital signatures using one or more token generation algorithms (which may, e.g., use current date/time and/or system identifiers as arguments).

At step 404, the blockchain management platform 102 may establish a connection with a quorum approver database. In one or more instances, the blockchain management platform 102 may establish a first wireless data connection with the quorum approver database 104 to link the blockchain management platform 102 to the quorum approver database 104.

Referring to FIG. 4B, at step 405, the blockchain management platform 102 may send digital signature information to the quorum approver database 104. In one or more instances, the blockchain management platform 102 may also send one or more commands directing the quorum approver database 104 to store the digital signature information along with other digital signature information corresponding to other quorum approvers associated with the sub-element in question. In addition, the blockchain management platform 102 may send one or more commands directing the quorum approver database 104 to concatenate authorization keys to the digital signature information. In one or more instances, the blockchain management platform 102 may send the digital signature information and the various sets commands to the quorum approver database 104 via the communication interface 113 and while the first wireless data connection is established.

At step 406, the quorum approver database 104 may receive the digital signature information and the commands sent at step 405. In one or more instances, the quorum approver database 104 may receive the digital signature information while the first wireless data connection is still established.

At step 407, the quorum approver database 104 may store the digital signature information received at step 406. In one or more instances, in storing the digital signature information, the quorum approver database 104 may store the digital signature information along with other digital signature information for quorum approvers corresponding to the sub-element in question. Furthermore, in storing the digital signature information, the quorum approver database 104 may concatenate one or more authorization keys to the digital signature information. In concatenating the authorization keys to the digital signature information, the quorum approver database 104 may indicate which portions of the sub-element and/or of the rest of the blockchain, the approver corresponding to the digital signature information may access, edit, or the like. For example, a first authorization key may grant access for an approver to edit a first parameter of the sub-element and a second authorization key may grant access for the approver to edit a second parameter.

At step 408, the blockchain management platform 102 may receive an indication of a change to the sub-element (e.g., due to a transaction, sale, merger, trade, or the like relating to an asset associated with the sub-element). At step 409, the blockchain management platform 102 may prompt for quorum approval of the change to the sub element. In one or more instances, the blockchain management platform 102 may approve change to the sub-element by performing actions similar to those described above with regard to steps 212-224.

Referring to FIG. 4C, at step 410, the blockchain management platform 102 may determine that quorum approval exceeds a predetermined quorum threshold. In one or more instances, in determining that the quorum approval exceeds the predetermined quorum threshold, the blockchain management platform may perform an analysis of trust levels corresponding to approvers that have contributed to the quorum. For example, if a particular approver has not responded to a quorum request for a time period corresponding to a predetermined duration (e.g., one year), and then suddenly starts to respond, the blockchain management platform 102 may flag the approver for further analysis (e.g., to determine whether the approver system has been accessed without authorization, infected with malware, or the like). In contrast, if a particular approver regularly participates in quorum requests (e.g., a particular number of responses in a set time period), the particular approver may be verified for quorum participation. In one or more instances, quorum histories associated with the various approvers that may be used in such trust analysis may be stored at the blockchain management platform 102. In one or more instances, the blockchain management platform 102 may use one or more machine learning algorithms and datasets to perform the analysis of trust levels.

In addition to trust levels, different weights may be granted to quorum approvals provided by different approvers. For example, a manager may be able to provide quorum approval equal to that of two subordinate employees put together. This weight may be based on a corporate hierarchy, shareholder percentages, or the like.

At step 411, after determining that the quorum approval satisfies the predetermined quorum threshold, the blockchain management platform may generate permission data indicating that the blockchain management platform 102 may modify the sub-element. At step 412, the blockchain management platform 102 may store the permission data generated at step 411.

Subsequently, the event sequence may end, and the blockchain management platform 102 may continue to perform bonding of new approvers for the blockchain. By performing such bonding, the blockchain management platform 102 may dynamically adjust quorum approver lists, which may result in increased quorum participation. By increasing quorum participation in this way, the blockchain management platform 102 may maintain integrity of the blockchain regardless of changing conditions of the approver list.

Figure 7:
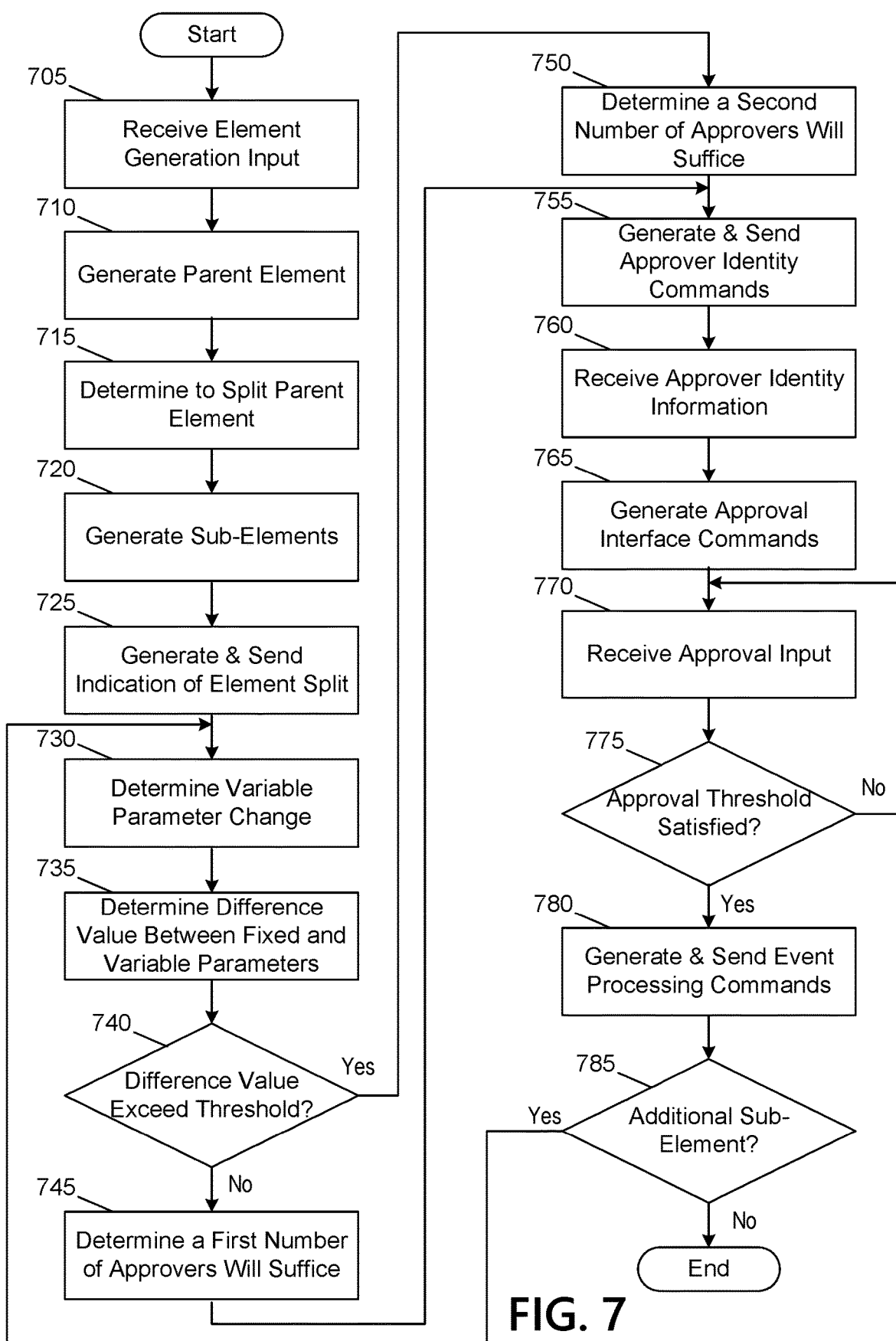
FIGS. 7-9 depict an illustrative methods for deploying an enhanced processing system that performs asset adjustment, cross sectional editing, and bonding for blockchain management in accordance with one or more example embodiments.

FIG. 7 depicts an illustrative method for deploying an enhanced processing system that performs dynamic asset adjustment for blockchain management in accordance with one or more example embodiments. Referring to FIG. 7, at step 705, a computing platform having at least one processor, a communication interface, and memory may receive an element generation input. At step 710, the computing platform may generate a parent element for a stored blockchain based on the element generation input. At step 715, the computing platform may determine to split the parent element. At step 720, based on the determination at step 715, the computing platform may generate one or more sub-elements, each containing a fixed parameter and a variable parameter, based on the parent element. At step 725, the computing platform may generate and send an indication of the element split to a client device. At step 730, the computing platform may determine that a change to the variable parameter of one of the sub-elements occurred. At step 735, the computing platform may determine a difference value between the fixed and variable parameters after the variable parameter change. At step 740, the computing platform may determine whether the difference value exceeds a predetermined threshold. If the difference value does not exceed the predetermined threshold, the computing platform may proceed to step 745. If the difference value does exceed the predetermined threshold, the computing platform may proceed to step 750.

At step 745, the computing device may determine that a first number of approvers will suffice. At step 750, the computing device may determine that a second number of approvers, larger than the first number of approvers, will suffice. At step 755, once the number of approvers is identified at step 745 or step 750, the computing platform may generate and send one or more commands directing a quorum approver database to provide quorum approver identity information. At step 760, the computing platform may receive the quorum approver identity information. At step 765, the computing platform may generate one or more commands directing a quorum approver device to generate a quorum approver interface. At step 770, the computing platform may receive a quorum approval input. At step 775, the computing platform may determine whether a threshold corresponding to the identified number of approvers is satisfied. If the threshold is not satisfied, the computing platform may return to step 770. If the threshold is satisfied, the computing platform may proceed to step 780.

At step 780, the computing platform may generate one or more commands directing an external event processor to process an event corresponding to the change in the variable parameter. At step 785, the computing platform may determine if an additional sub-element in the blockchain was generated in the element split. If an additional sub-element was generated, the computing platform may return to step 730. If an additional sub-element was not generated, the method may end.

Figure 8:
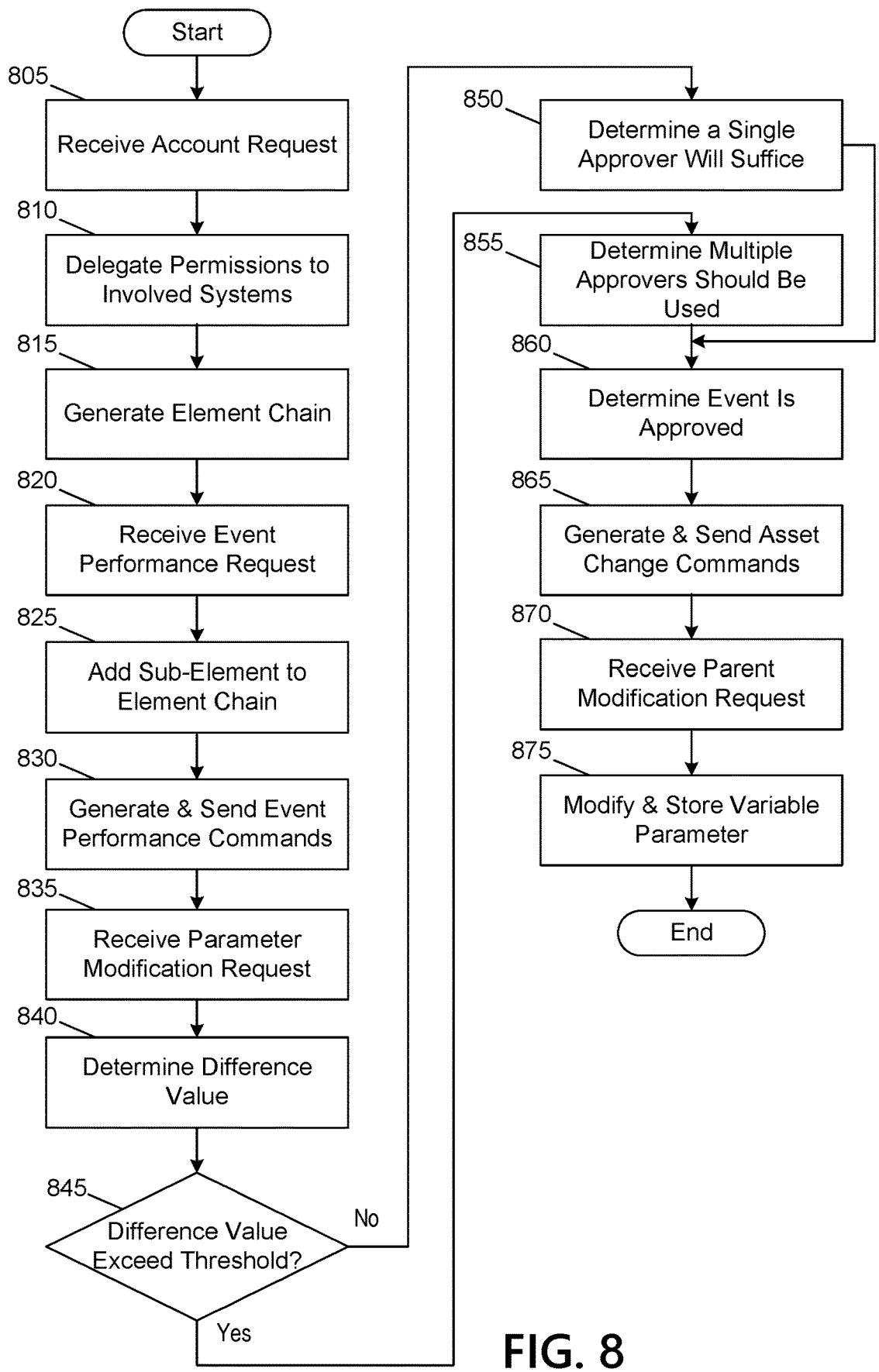

FIG. 8 depicts an illustrative method for deploying an enhanced processing system that performs cross sectional asset editing for blockchain management in accordance with one or more example embodiments. At step 805, a computing platform may receive a request to establish an account, which may (in some instances) contain permission data indicating portions of an event processing sequence that the computing platform and other computing platforms may perform. At step 810, the computing platform may delegate permissions to the other computing platforms accordingly. At step 815, the computing platform may generate an element chain corresponding to the account. At step 820, the computing platform may receive a request to process an event with regard to the account. At step 825, the computing platform may add a sub-element to the element chain corresponding to the event. At step 830, the computing platform may generate and send one or more commands directing an external event processor 103 to process the event. At step 835, the computing platform may receive a request to modify a variable parameter of the sub-element based on performance of the event. At step 840, the computing platform may determine a difference value between the variable parameter and a fixed parameter of the sub-element. At step 845, the computing platform may determine whether the difference value exceeds a predetermined threshold. If the difference value does not exceed the predetermined threshold, the computing platform may proceed to step 850. If the difference value does exceed the predetermined threshold, the computing platform may proceed to step 855.

At step 850, the computing platform may determine that a single approver may suffice. At step 855, the computing platform may determine that multiple approvers should be used. At step 860, the computing platform may determine that the event is approved. At step 865, the computing platform may generate and send one or more commands directing an external resource management platform 105 to cause a change in assets. At step 870, the computing platform may receive a request to modify a variable parameter of a parent element of the stored element chain. At step 875, the computing platform may modify and store the variable parameter of the parent element accordingly.

Figure 9:
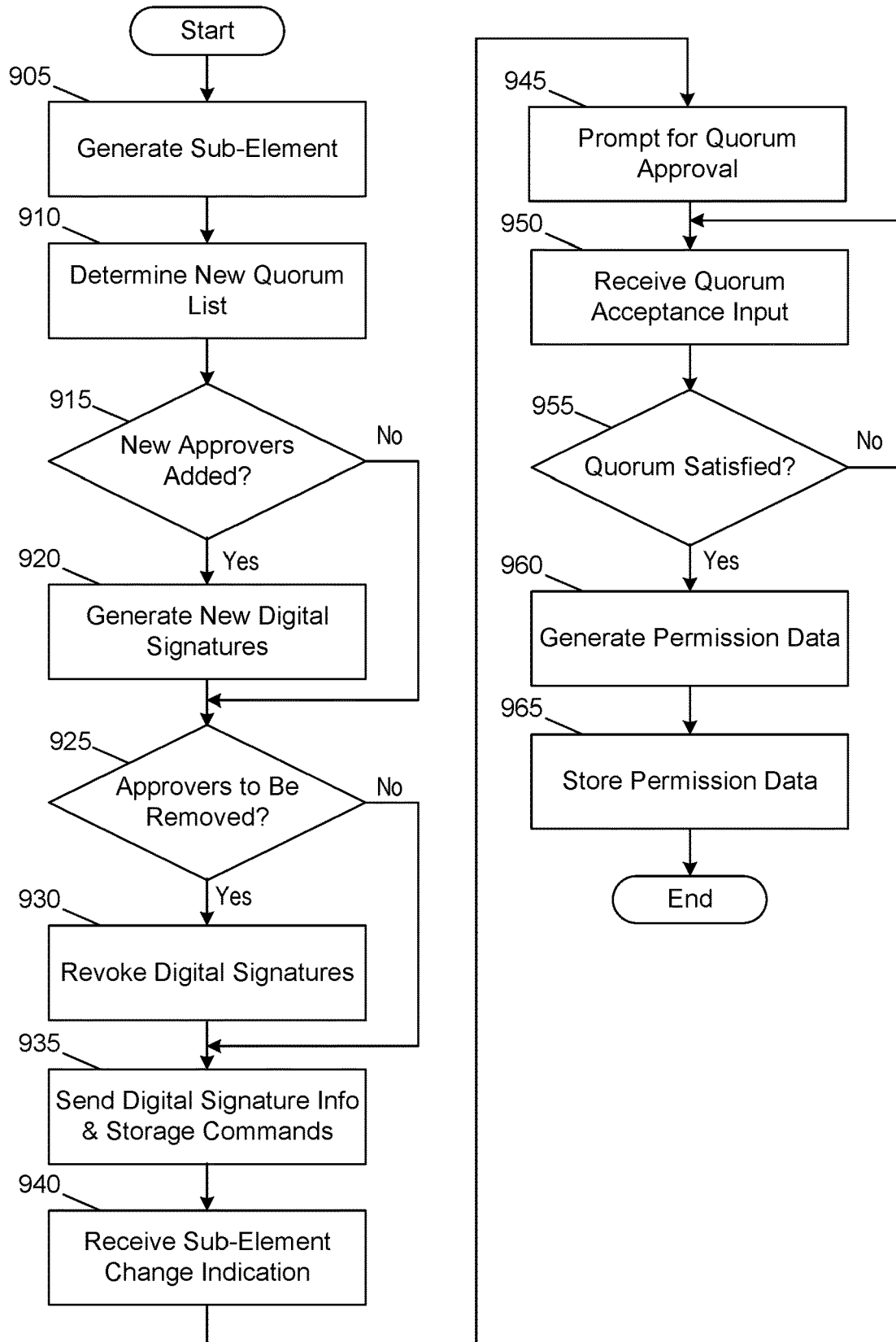

FIG. 9 depicts an illustrative method for deploying an enhanced processing system that performs bonding of new approvers for blockchain management in accordance with one or more example embodiments. Referring to FIG. 9, at step 905, a computing platform having at least one processor, a communication interface, and memory may generate a sub-element relating to a parent element of a stored blockchain. At step 910, the computing platform may determine a new quorum list corresponding to the sub-element. At step 915, the computing platform may determine whether the quorum list includes any new approvers. If the quorum list does not include any new approvers, the computing platform may proceed to step 920. If the quorum list does include new approvers, the computing platform may proceed to step 925.

At step 920, the computing platform may generate new digital signatures for each of the new approvers. At step 925, the computing platform may determine whether approvers should be removed from the quorum list. If approvers should be removed from the quorum list, the computing platform may proceed to step 930. If approvers should not be removed from the quorum list, the computing platform may proceed to step 935.

At step 930, the computing platform may revoke digital signatures corresponding to the approvers to be removed. At step 935, the computing platform may send digital signature information and one or more commands directing the quorum approver database 104 to store the digital signature information. At step 940, the computing platform may receive an indication of a change to the sub-element. At step 945, the computing platform may prompt for quorum approval of the change to the sub-element. At step 950, the computing platform may receive a quorum acceptance input indicating approval of the change to the sub-element. At step 955, the computing platform may determine whether the quorum threshold is satisfied. If the quorum threshold is not satisfied, the computing platform may return to step 950. If the quorum threshold is satisfied, the computing platform may proceed to step 960. At step 960, the computing platform may generate permission data after determining that the quorum is satisfied. At step 965, the computing platform may store the permission data.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A blockchain management computing platform comprising:
    at least one processor;
    a communication interface communicatively coupled to the at least one processor; and
    memory storing computer-readable instructions that, when executed by the processor, cause the blockchain management computing platform to:
        determine to split a parent element of a stored element chain into one or more sub-elements;
        generate the one or more sub-elements, wherein:
            each sub-element contains a fixed parameter and a variable parameter, and each sub-element is linked to the parent element through the stored element chain;
determine a change in the variable parameter, resulting in a modified variable parameter and a difference value, wherein the difference value indicates a difference between the modified variable parameter and the variable parameter;
compare the difference value to a plurality of predetermined discrepancy thresholds;
based on the comparison of the difference value to the plurality of predetermined discrepancy thresholds, determine a number of quorum approvers for approval of the change to the variable parameter, wherein determining the number of quorum approvers for approval of the change to the variable parameter comprises:
in response to determining that the difference value does not exceed a first threshold of the plurality of predetermined discrepancy thresholds, determining a first number of quorum approvers;
in response to determining that the difference value exceeds the first threshold of the plurality of predetermined discrepancy thresholds but does not exceed a second threshold of the plurality of predetermined discrepancy thresholds, determining a second number of quorum approvers; and
in response to determining that the difference value exceeds the second threshold of the plurality of predetermined discrepancy thresholds, determining a third number of quorum approvers;
receive a plurality of quorum approval inputs corresponding to the number of quorum approvers for the approval of the change to the variable parameter;
determine, based on the plurality of quorum approval inputs received, that a quorum approval threshold is satisfied; and
in response to determining that the quorum approval threshold is satisfied, send one or more commands directing an external event processor to process an event corresponding to the change in the variable parameter.

2. The blockchain management computing platform of claim 1, wherein sending the one or more commands directing the external event processor to process the event corresponding to the change in the variable parameter causes the external event processor to process the event corresponding to the change in the variable parameter.

3. The blockchain management computing platform of claim 1, wherein the memory stores additional computer-readable instructions that, when executed by the at least one processor, further cause the blockchain management computing platform to:
receive an element generation input; and
in response to receiving the element generation input, generate the stored element chain including the parent element.

4. The blockchain management computing platform of claim 1, wherein the memory stores additional computer-readable instructions that, when executed by the at least one processor, further cause the blockchain management computing platform to:
generate an indication of the generation of the one or more sub-elements; and
send, to a client device, the indication of the generation of the one or more sub-elements, wherein sending the indication of the generation of the one or more sub-elements causes the client device to display an element split interface indicating the generation of the one or more sub-elements.

5. The blockchain management computing platform of claim 1, wherein the memory stores additional computer-readable instructions that, when executed by the at least one processor, further cause the blockchain management computing platform to:
generate one or more commands directing a quorum approver database to provide quorum approver identity information corresponding to each of the one or more sub-elements;
send, to the quorum approver database, the one or more commands directing the quorum approver database to provide the quorum approver identity information corresponding to each of the one or more sub-elements; and
receive, from the quorum approver database, the quorum approver identity information corresponding to each of the one or more sub-elements, wherein the quorum approver identity information indicates quorum approvers configured to provide approval of the change to the variable parameter.

6. The blockchain management computing platform of claim 1, wherein the memory stores additional computer-readable instructions that, when executed by the at least one processor, further cause the blockchain management computing platform to:
generate quorum interface information and one or more commands directing a quorum approver device to generate a quorum approval interface using the quorum interface information; and
send, to the quorum approver device, the quorum interface information and the one or more commands directing the quorum approver device to generate the quorum approval interface using the quorum interface information.

7. The blockchain management computing platform of claim 1, wherein:
the second threshold of the plurality of predetermined discrepancy thresholds is higher than the first threshold of the plurality of predetermined discrepancy thresholds;
the second number of quorum approvers is larger than the first number of quorum approvers; and
wherein the third number of quorum approvers is larger than the second number of quorum approvers.

8. The blockchain management computing platform of claim 1, wherein determining that the quorum approval threshold is satisfied comprises:
receiving, for each of the plurality of quorum approval inputs, approver information indicating whether or not a corresponding quorum approver has responded to a quorum request within a predetermined time period; and
in response to determining that one or more quorum approvers have not responded to a quorum request within the predetermined time period, flagging the corresponding quorum approval inputs for further review, wherein determining that the quorum approval threshold is satisfied comprises determining that the quorum approval threshold is satisfied based on determining that the one or more quorum approvers have responded to a quorum request within the predetermined time period.

9. The blockchain management computing platform of claim 1, wherein determining that the quorum approval threshold is satisfied comprises:
receiving, for each of the plurality of quorum approval inputs, approver information indicating job roles of corresponding quorum approvers; and
weighting, based on the job roles, each of the plurality of quorum approval inputs.

10. A method comprising:
at a blockchain management computing platform comprising at least one processor, a communication interface, and memory:
determining to split a parent element of a stored element chain into one or more sub-elements;
generating the one or more sub-elements, wherein:
each sub-element contains a fixed parameter and a variable parameter, and
each sub-element is linked to the parent element through the stored element chain;
determining a change in the variable parameter, resulting in a modified variable parameter and a difference value, wherein the difference value indicates a difference between the modified variable parameter and the variable parameter;
comparing the difference value to a plurality of predetermined discrepancy thresholds;
based on the comparison of the difference value to the plurality of predetermined discrepancy thresholds, determining a number of quorum approvers for approval of the change to the variable parameter, wherein determining the number of quorum approvers for approval of the change to the variable parameter comprises:
in response to determining that the difference value does not exceed a first threshold of the plurality of predetermined discrepancy thresholds, determining a first number of quorum approvers;
in response to determining that the difference value exceeds the first threshold of the plurality of predetermined discrepancy thresholds but does not exceed a second threshold of the plurality of predetermined discrepancy thresholds, determining a second number of quorum approvers; and
in response to determining that the difference value exceeds the second threshold of the plurality of predetermined discrepancy thresholds, determining a third number of quorum approvers;
receiving a plurality of quorum approval inputs corresponding to the number of quorum approvers for the approval of the change to the variable parameter;
determining, based on the plurality of quorum approval inputs received, that a quorum approval threshold is satisfied; and
in response to determining that the quorum approval threshold is satisfied, send one or more commands directing an external event processor to process an event corresponding to the change in the variable parameter.

11. The method of claim 10, wherein sending the one or more commands directing the external event processor to process the event corresponding to the change in the variable parameter causes the external event processor to process the event corresponding to the change in the variable parameter.

12. The method of claim 10, further comprising:
receiving an element generation input; and
in response to receiving the element generation input, generating the stored element chain including the parent element.

13. The method of claim 10, further comprising:
generating an indication of the generation of the one or more sub-elements; and
sending, to a client device, the indication of the generation of the one or more sub-elements, wherein sending the indication of the generation of the one or more sub-elements causes the client device to display an element split interface indicating the generation of the one or more sub-elements.

14. The method of claim 10, further comprising:
generating one or more commands directing a quorum approver database to provide quorum approver identity information corresponding to each of the one or more sub-elements;
sending, to the quorum approver database, the one or more commands directing the quorum approver database to provide the quorum approver identity information corresponding to each of the one or more sub-elements; and
receiving, from the quorum approver database, the quorum approver identity information corresponding to each of the one or more sub-elements, wherein the quorum approver identity information indicates quorum approvers configured to provide approval of the change to the variable parameter.

15. The method of claim 10, further comprising:
generating quorum interface information and one or more commands directing a quorum approver device to generate a quorum approval interface using the quorum interface information; and
sending, to the quorum approver device, the quorum interface information and the one or more commands directing the quorum approver device to generate the quorum approval interface using the quorum interface information.

16. The method of claim 10, wherein:
the second threshold of the plurality of predetermined discrepancy thresholds is higher than the first threshold of the plurality of predetermined discrepancy thresholds;
the second number of quorum approvers is larger than the first number of quorum approvers; and
wherein the third number of quorum approvers is larger than the second number of quorum approvers.

17. The method of claim 10, wherein determining that the quorum approval threshold is satisfied comprises:
receiving, for each of the plurality of quorum approval inputs, approver information indicating whether or not a corresponding quorum approver has responded to a quorum request within a predetermined time period; and
in response to determining that one or more quorum approvers have not responded to a quorum request within the predetermined time period, flagging the corresponding quorum approval inputs for further review, wherein determining that the quorum approval threshold is satisfied comprises determining that the quorum approval threshold is satisfied based on determining that the one or more quorum approvers have responded to a quorum request within the predetermined time period.

18. The method of claim 10, wherein determining that the quorum approval threshold is satisfied comprises:

receiving, for each of the plurality of quorum approval inputs, approver information indicating job roles of corresponding quorum approvers; and weighting, based on the job roles, each of the plurality of quorum approval inputs.

19. One or more non-transitory computer-readable media storing instructions that, when executed by a blockchain management computing platform comprising at least one processor, a communication interface, and memory, cause the blockchain management computing platform to:

determine to split a parent element of a stored element chain into one or more sub-elements;

generate the one or more sub-elements, wherein:
  each sub-element contains a fixed parameter and a variable parameter, and
  each sub-element is linked to the parent element through the stored element chain;

determine a change in the variable parameter, resulting in a modified variable parameter and a difference value, wherein the difference value indicates a difference between the modified variable parameter and the variable parameter;

compare the difference value to a plurality of predetermined discrepancy thresholds;

based on the comparison of the difference value to the plurality of predetermined discrepancy thresholds, determine a number of quorum approvers for approval of the change to the variable parameter, wherein determining the number of quorum approvers for approval of the change to the variable parameter comprises:
  in response to determining that the difference value does not exceed a first threshold of the plurality of predetermined discrepancy thresholds, determining a first number of quorum approvers;
  in response to determining that the difference value exceeds the first threshold of the plurality of predetermined discrepancy thresholds but does not exceed a second threshold of the plurality of predetermined discrepancy thresholds, determining a second number of quorum approvers; and
  in response to determining that the difference value exceeds the second threshold of the plurality of predetermined discrepancy thresholds, determining a third number of quorum approvers;

receive a plurality of quorum approval inputs corresponding to the number of quorum approvers for the approval of the change to the variable parameter;

determine, based on the plurality of quorum approval inputs received, that a quorum approval threshold is satisfied; and in response to determining that the quorum approval threshold is satisfied, send one or more commands directing an external event processor to process an event corresponding to the change in the variable parameter.

20. The one or more non-transitory computer-readable media of claim 19, wherein sending the one or more commands directing the external event processor to process the event corresponding to the change in the variable parameter causes the external event processor to process the event corresponding to the change in the variable parameter.

* * * * *